(12) United States Patent
Pugliese et al.

(10) Patent No.: US 11,900,942 B2
(45) Date of Patent: Feb. 13, 2024

(54) SYSTEMS AND METHODS OF INTEGRATING LEGACY CHATBOTS WITH TELEPHONE NETWORKS

(71) Applicant: Interactive Media S.p.A, Rome (IT)

(72) Inventors: Livio Pugliese, Capitola, CA (US); Roberto Marega, Rome (IT); Alberto Navatta, Rome (IT)

(73) Assignee: Interactive Media S.p.A., Rome (IT)

( * ) Notice: Subject to any disclaimer, the term of this patent is extended or adjusted under 35 U.S.C. 154(b) by 322 days.

(21) Appl. No.: 17/539,731

(22) Filed: Dec. 1, 2021

(65) Prior Publication Data

US 2022/0180874 A1 Jun. 9, 2022

Related U.S. Application Data

(60) Provisional application No. 63/120,865, filed on Dec. 3, 2020.

(51) Int. Cl.

| | |
|---|---|
| *G10L 15/26* | (2006.01) |
| *G10L 15/22* | (2006.01) |
| *G10L 15/30* | (2013.01) |
| *G10L 13/02* | (2013.01) |
| *H04L 67/02* | (2022.01) |
| *G10L 13/08* | (2013.01) |

(52) U.S. Cl.
CPC ............ *G10L 15/26* (2013.01); *G10L 13/02* (2013.01); *G10L 13/08* (2013.01); *G10L 15/22* (2013.01); *G10L 15/30* (2013.01); *H04L 67/02* (2013.01); *G10L 2015/223* (2013.01)

(58) Field of Classification Search
CPC ......... G10L 15/26; G10L 13/02; G10L 13/08; G10L 15/22; G10L 15/30; G10L 2015/223; H04L 67/02; H04L 51/02; H04L 51/222; H04L 51/066; H04L 67/10; G06N 3/006; G06F 40/58

See application file for complete search history.

(56) References Cited

U.S. PATENT DOCUMENTS

| | | | | |
|---|---|---|---|---|
| 2008/0147406 | A1* | 6/2008 | Da Palma | H04L 51/02 |
| | | | | 704/E15.04 |
| 2011/0202347 | A1* | 8/2011 | Moore | H04L 67/565 |
| | | | | 704/260 |
| 2020/0175430 | A1* | 6/2020 | Kochura | H04L 51/02 |
| 2020/0287851 | A1* | 9/2020 | Anderson | G06F 40/205 |
| 2020/0349614 | A1* | 11/2020 | Batcha | H04M 3/5141 |

* cited by examiner

*Primary Examiner* — Yogeshkumar Patel
(74) *Attorney, Agent, or Firm* — Stephen E. Zweig

(57) ABSTRACT

A software-based system and method that provides a generalized scheme to voice-enable text-oriented chatbots. The system can be configured to adapt to a plurality of different types of chatbots, a plurality of different speech-to-text and text-to-speech services, a plurality of different grammars, and even a plurality of different languages. The system can further be configured to handle "HTTP complex" situations such as electronic calendars by automatically analyzing these HTTP complex situations into various sub-dialogs, which the system can then automatically use to communicate with users, and then present the final results back to the chatbot. These methods enable organizations to preserve their extensive investment in legacy chatbots while rapidly and relatively inexpensively providing voice functionality to a broader range of users.

20 Claims, 18 Drawing Sheets

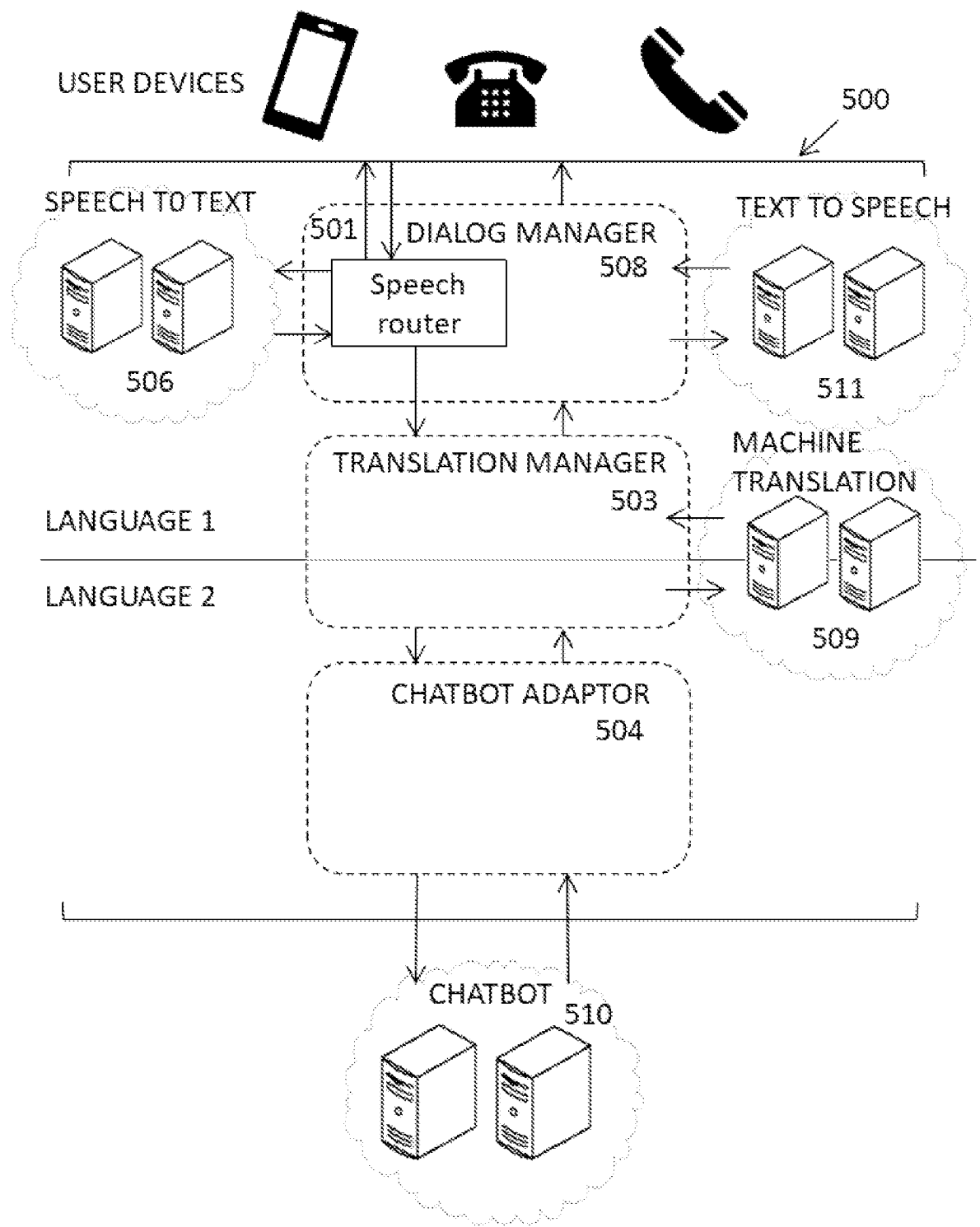

Chatbot adaptor

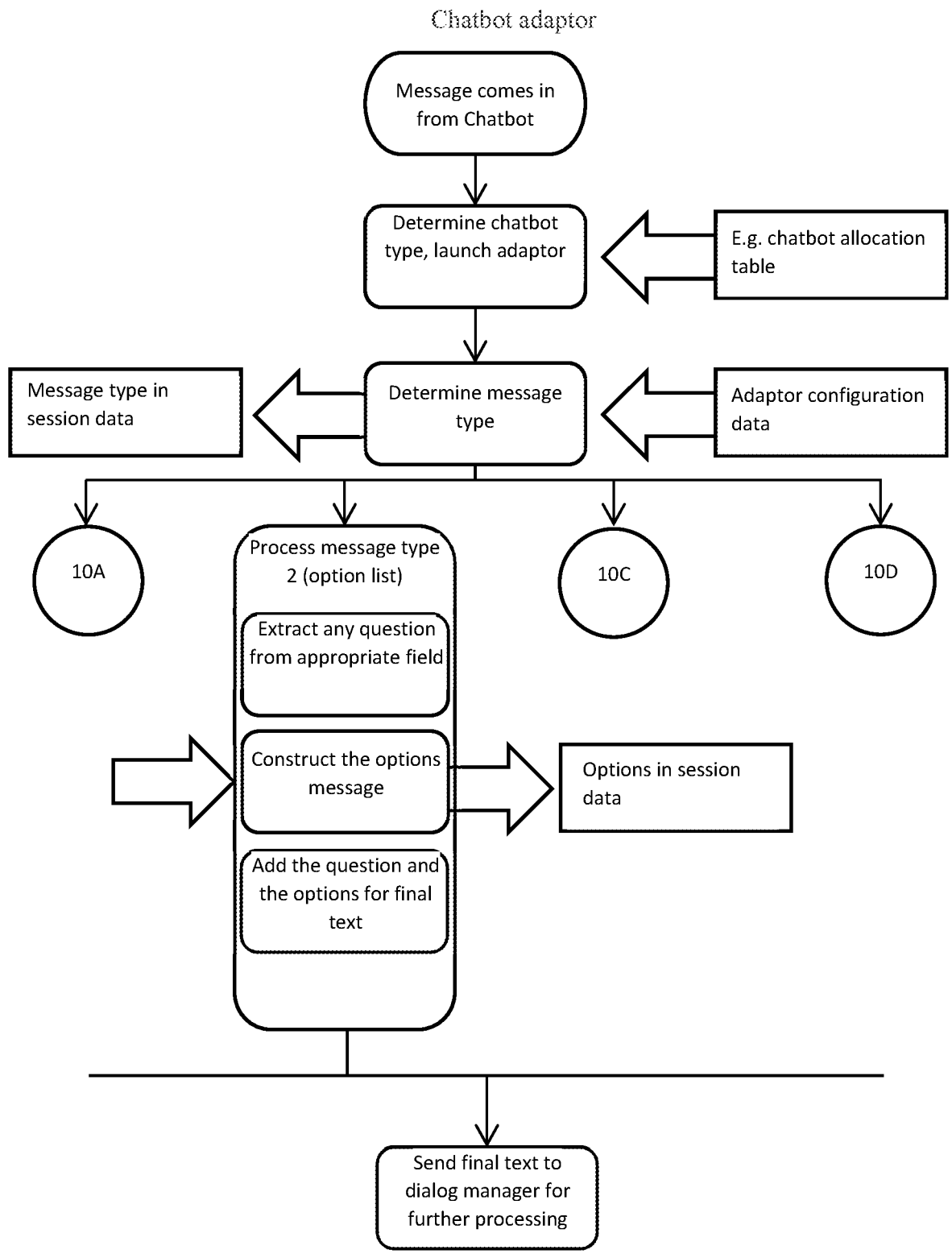

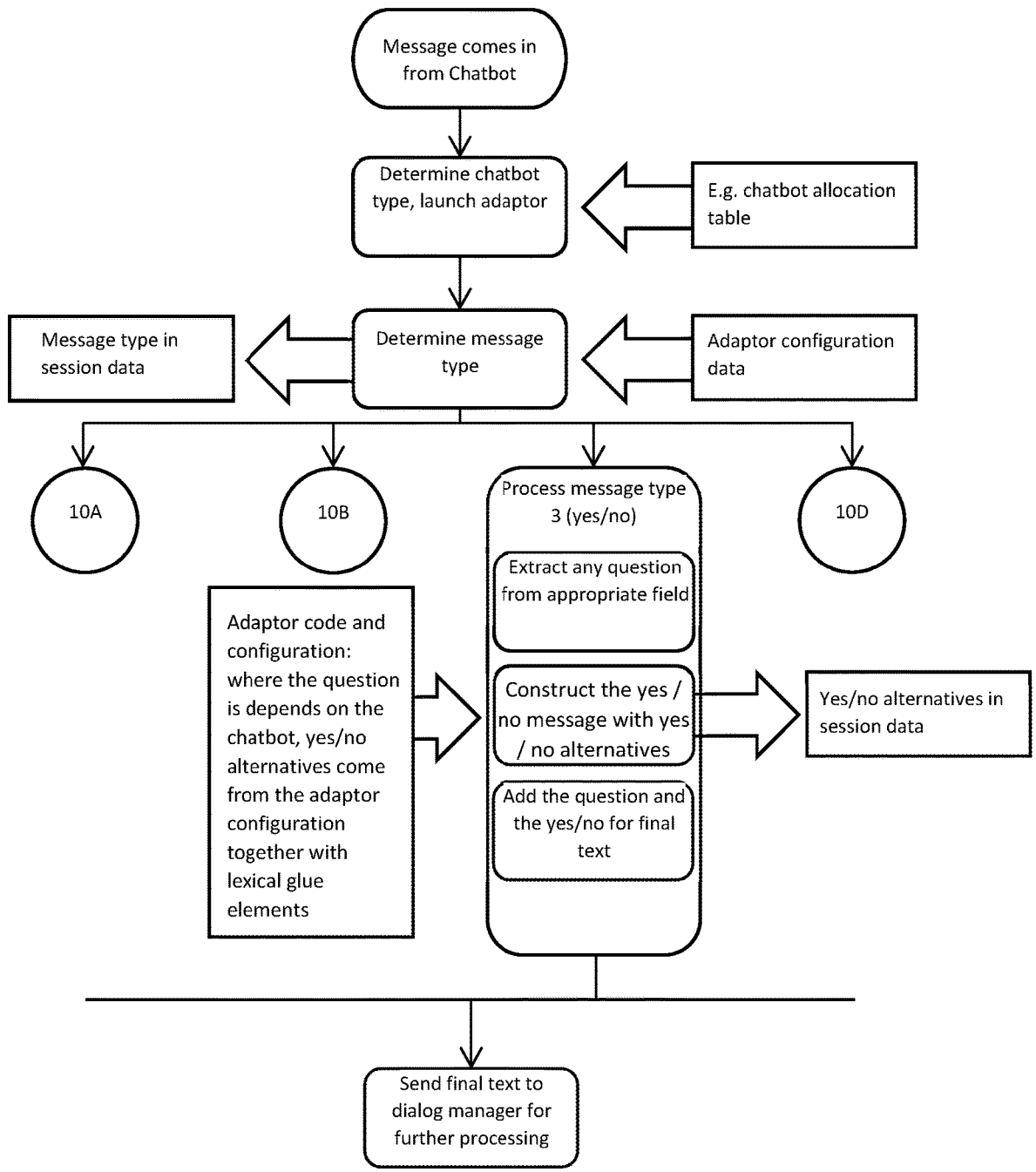

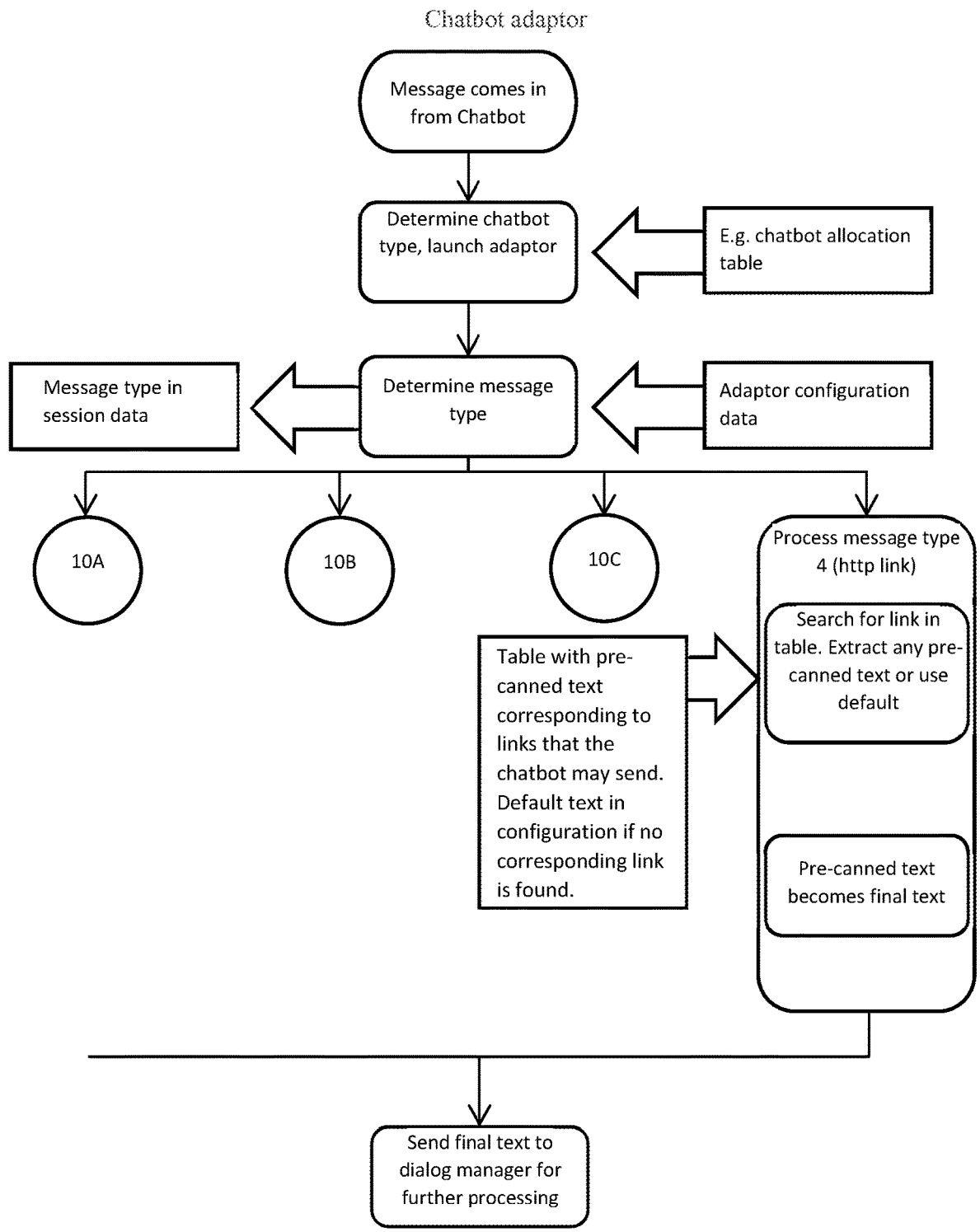

Dialog manager

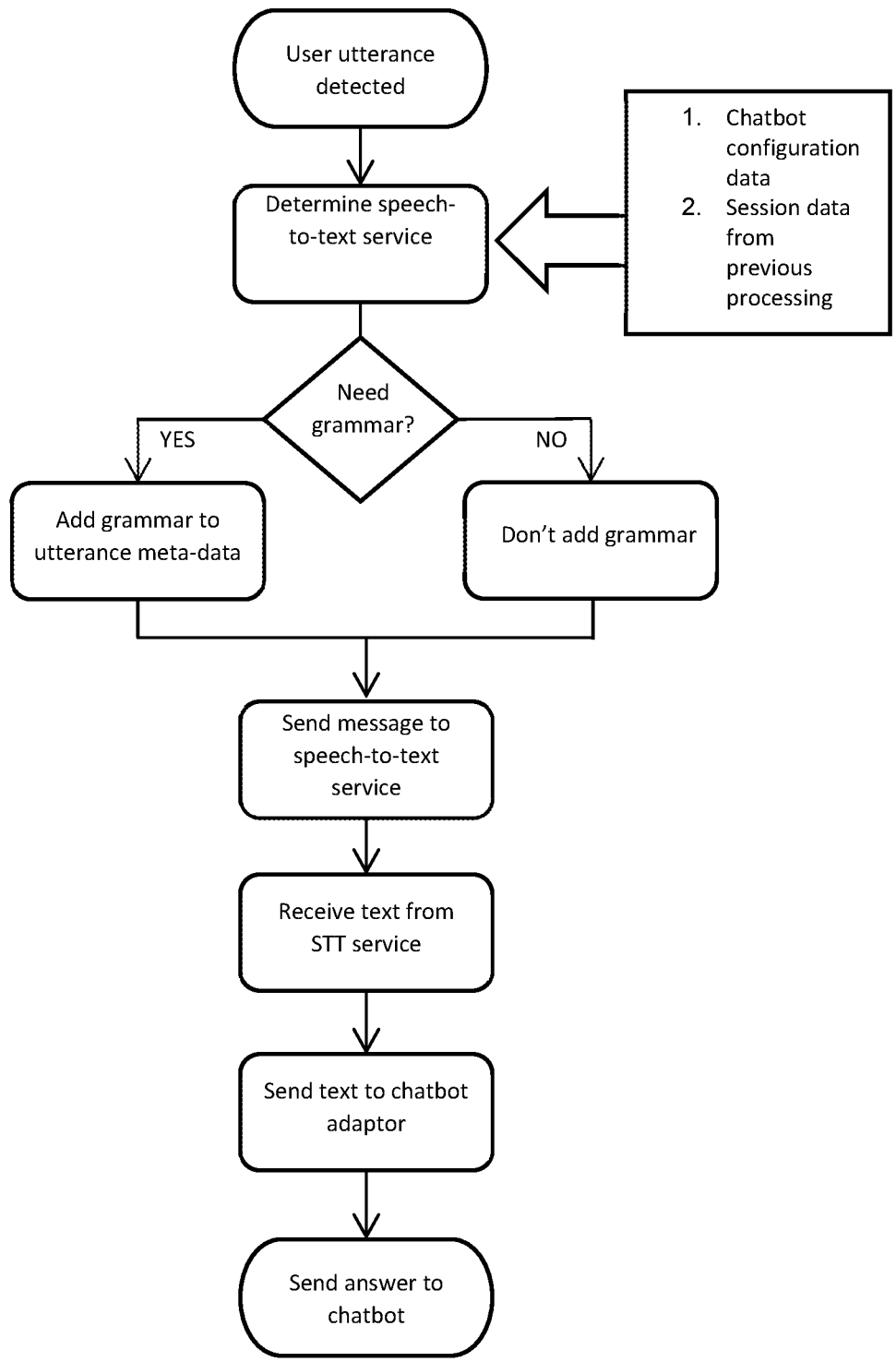

HTTP complex message

HTTP complex message

Asynchronous to synchronous

SYSTEMS AND METHODS OF INTEGRATING LEGACY CHATBOTS WITH TELEPHONE NETWORKS

CROSS REFERENCE TO RELATED APPLICATIONS

This application claims the priority benefit of U.S. provisional patent application 63/120,865, filed Dec. 3, 2020, the entire contents of which are incorporated herein by reference.

BACKGROUND OF THE INVENTION

Field of the Invention

Systems and methods for automatically connecting legacy, non-voice interactive, chatbots (automatic chat applications) with telephone or other voice networks.

Description of the Related Art

To remain competitive, businesses must adapt quickly to evolving consumer demands while also providing customers with the high-quality products and services they desire. Many companies employ contact centers that include automated systems and business representatives to process interactions and service their customers' needs.

Such contact centers may utilize several communication channels to engage with customers, such as telephone, email, live web chat, chat over social media platforms, and the like. For example, in many instances, an end-user (customer) communication may be directed to a live human agent to assist the end-user with their needs.

Utilizing live human agents for all contact center communications can be time-consuming and expensive for both the business and the end-users or customers who must wait for qualified agents to become available. Furthermore, employing live human agents adds overhead costs and complexity to the business operation, leading to higher costs to consumers.

For this reason, many businesses have deployed chatbots (or chat bots). These are computerized systems that typically implement a computing technique called Conversational AI. The chatbot conversational AI is configured to recognize the users' intent in contacting the business. It provides at least some support and answers some of the user's questions before the users' queries are turned over to human agents. In some instances, depending on the chatbot's sophistication, the chatbot can provide a resolution without human intervention.

At present, most chatbots only interact with users through text channels, such as input from websites and chat applications on smartphones. For this disclosure, we are focusing on text-based chatbots, that is, chatbots that are natively configured to only act on text-based channels. Thus, going forward, in this disclosure, the term "chatbot," absent elaboration, refers to a text-based chatbot.

However, despite prior art chatbots, a substantial percentage of users' communications with businesses are often voice communications that occur on the telephone channel. These "voice" communications are typically routed through a different path than text, and voice communications often reach human agents directly. The differences of different modes of communications (e.g., text, voice) thus results in inefficiencies and loss of time for both users and agents. The prior art conversational AI techniques that a business may deploy for chat (chatbots) typically cannot directly be used for voice communications.

Prior art techniques and systems exist to bridge the gap between chat communication (chatbots) and voice communication (typically telephone, but this also includes other means of voice transport). These systems typically use speech-to-text services to transform users' utterances into text that chatbots can consume and text-to-speech services to convert text-based responses into voice, which can be streamed to users. However, at present, such prior art systems are inflexible. Generally, each must be laboriously customized to a particular chatbot and a particular speech-to-text service.

BRIEF SUMMARY OF THE INVENTION

This Invention is based, in part, on the insight that instead of laboriously customizing each legacy chatbot for voice functionality, what is needed is a more general-purpose system that can work with a plurality of different chatbots and a plurality of various speech-to-text services.

This Invention is also based on the insight that methods that provide improved systems and processes that implement a more natural and flexible voice conversation between chatbots and users would be highly desirable.

As will be described, the present Invention (often called the system) is directed to improved methods to provide chatbots with telephone interfaces supporting voice conversations.

The Invention can comprise a central service, sometimes referred to herein as a SPEECH GATEWAY, that can provide the means to overcome the many reasons why prior art chatbots generally could not directly interact with telephone interfaces with any degree of success.

In this disclosure, note that the term "text chat" refers not only to standard alphanumeric text characters, but often also to more complex interactive computer graphics which may be rendered on bit mapped computer displays, often using standard HTML, methods. However, the term does exclude speech or voice recognition.

As previously discussed, native text-based chatbots, which comprise the vast majority of all chatbots in operation, cannot act directly on spoken input. Part of the problem is that human speech is variable, and different speech recognition systems vary greatly in performance and accuracy between different human speakers. As will be discussed, some embodiments of the present Invention are configured to choose among different speech recognition systems. These embodiments can, for example, use knowledge about the chatbot type and speaker type to automatically pick the most suitable (usually the most accurate) commercial speech service to transform speech into text that chatbots can process. These embodiments can also automatically pick the most suitable text-to-speech service to translate the chatbot's output text into speech that can be understood by a given user, often based again on chatbot type and user characteristics.

Standard chatbots typically are configured to use a conversational style that, while good for text chat, is not necessarily good for voice chat. As will be discussed, some embodiments of the Invention are configured to further use a software adaptor service or module (part of the system/invention, to be described) to transform computer communication, originally intended to be rendered as text or web forms into speech optimized text. This speech-optimized text is more suitable for being automatically rendered into standard speech to the user during a telephone conversation.

In addition to text output, prior art (standard text-based) chatbots are often engineered to add certain visual elements (pictures, HTTP elements, videos, buttons to be selected) to a text channel. As a result, human users may enter information by text and by clicking on buttons or selecting icons with a pointing device (e.g., by touching on a touchscreen). As will be discussed, in some embodiments, the Invention may also translate these visual operations into appropriate audio conversations with the users to elucidate the same types of information.

Chatbots may or may not be multilingual. Some embodiments of the Invention may further use machine translation to translate speech in one language to text in another language supported by the chatbot, feed it to the chatbot, and translate the response into the original language before speaking the translation to the user on the telephone channel.

In contrast to prior-art chatbots, which typically cannot interact with voice-based agents in contact centers, some embodiments of the present Invention allow users and data to gracefully transfer back and forth between voice-based call centers and chatbot sessions.

As will be discussed, in some embodiments, the present Invention can be configured with knowledge about the contact center software interface and use this user interface knowledge to gracefully transfer the (originally chatbot mediated) telephone call with the user to a human agent at the call center. To facilitate such a graceful transfer, in some embodiments, the Invention may also transfer chatbot session associated data (e.g., information about the chatbot's previous interactions with that user) to the contact center agent. Thus, the human contact center agent can be looking at the previous chatbot-acquired data while talking with the user in a nearly seamless transition between the (voice translated) chatbot session and the (human operator) contact center session. From the user's standpoint, the transaction can be like switching from a voice session with a first operator (the chatbot) to a voice session with a second operator (the contact center).

BRIEF DESCRIPTION OF THE DRAWINGS

FIG. 9 shows how, in some embodiments, a system based on the Invention can translate between different languages using an optional translation manager module.

FIG. 10B shows a second more detailed flow-chart of how the Invention's chatbot adaptor operates.

FIG. 10C shows a third more detailed flow-chart of how the Invention's chatbot adaptor operates.

FIG. 10D shows a fourth more detailed flow-chart of how the Invention's chatbot adaptor operates.

FIG. 12 shows an additional detailed flow-chart of how the Invention's dialog manager operates.

DETAILED DESCRIPTION OF THE INVENTION

Figure 1:
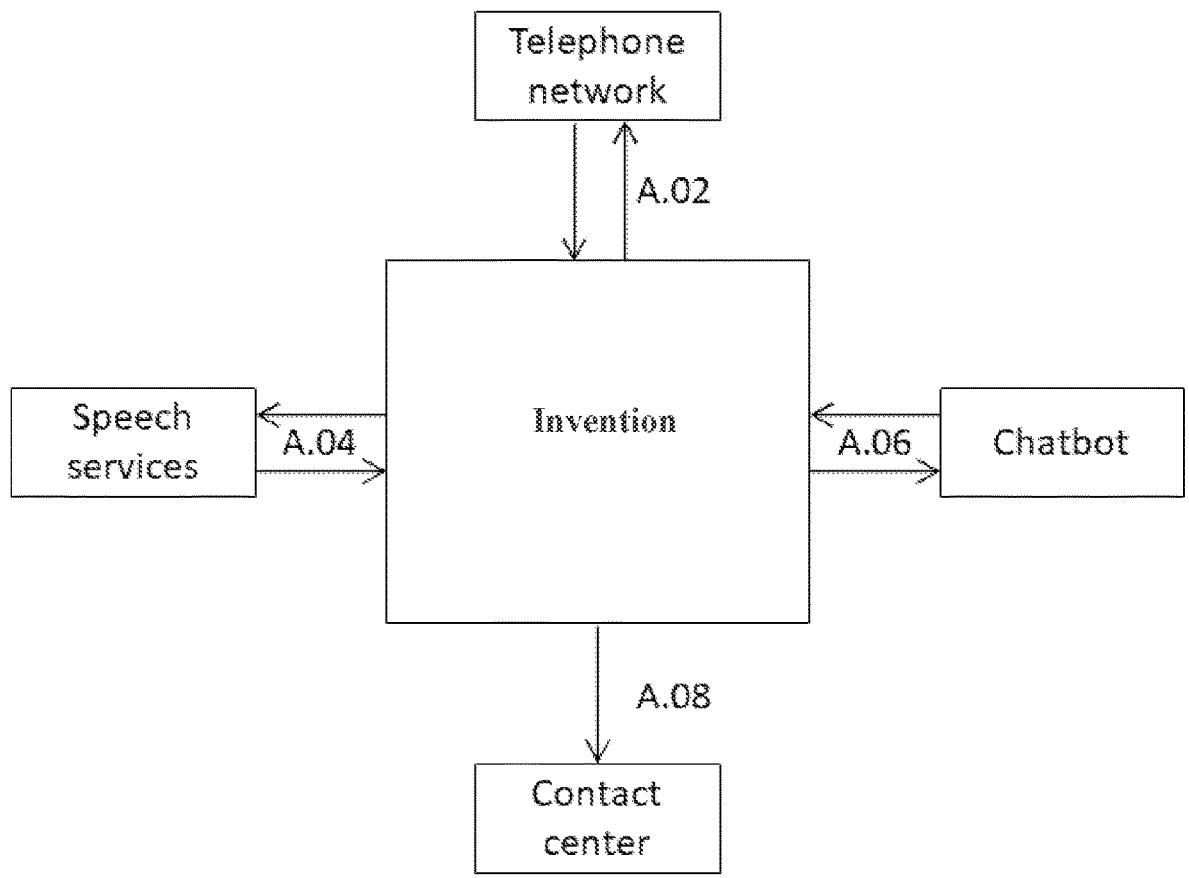
FIG. 1 shows that the Invention comprises a computerized system, typically comprising at least one computer processor and memory, that electronically communicates with automated speech to text services (speech services), chatbots, optional customer contact centers, and the telephone network to allow text-oriented chatbots to operate over telephone networks.

This disclosure is directed at systems and methods to enable text-only chatbots to converse with users on the telephone channel or other voice-based channels. The Invention is placed at the intersection of several specialized services, orchestrating their use for the task at hand. The disclosure characterizes how the system uses these different services and manipulates data and content flowing through it to transform overall chatbot "text" into the correspondent voice, and vice-versa.

About chatbots: for purposes of this disclosure, a chatbot (text-based chatbot) is defined as a software-based computer program or application that simulates, through text or HTML, interactions, how a human would behave as a conversational partner. Chatbots are widely used in commerce, healthcare, education, and government for many purposes, particularly for customer service on websites or smartphone/tablet apps. Another frequent term for a chatbot is a "virtual assistant". Chatbots often show either a static or animated image of a person to help encourage the user to act as if they were corresponding with a human. Chatbots are usually configured to accept text, mouse, or touchscreen input, occasionally graphic image input (e.g., scanned receipts, photographs, possibly short video), and usually respond with various combinations of text or graphics.

Although voice recognition programs exist that can recognize voice input from humans and respond with various combinations of voice output, text, or graphics, for this disclosure, these voice-based systems are not considered to be "chatbots." Put alternatively, in this disclosure, the term "chatbot" is defined as a chatbot that, absent the additional methods described herein (e.g., in "native" mode), cannot operate with voice input or voice output. Thus the "chatbots" in this disclosure can also be understood as operating in "native" mode with text input, mouse input, touchscreen input, or graphical image input, but do not accept speech input and usually do not output speech. In other words, such "legacy" chatbots can be considered to be legacy "silent" chatbots, somewhat in analogy to silent films from another era. Note, however, that the term "legacy" merely means that the chatbot was not initially developed for voice input/output. It does not mean that the chatbot is old. Indeed, such legacy (non-voice I/O) chatbots will continue to be developed for the foreseeable future.

For this disclosure, the key point is that there are many legacy chatbots that, in native mode, can't operate with voice input and usually can't provide voice output. These legacy "silent" chatbots (here again usually described as just "chatbot") represent an enormous investment in programming and institutional know-how. The systems and methods described herein thus provide a way to rapidly modernize and upgrade these legacy "silent" chatbots with more modern voice recognition capability without incurring the large time, institutional burden, and high costs of reprogramming these legacy silent chatbots.

Chatbots (legacy silent chatbots) can be of any degree of sophistication, ranging from simple "scan for cue word or phrase" and respond with a preprogrammed response type system; to complex artificial intelligent (AI) systems that may employ natural language processing, machine leaning, neural networks and the like. For this disclosure, the key aspect is that the Invention works with chatbots that do not natively have speech input (and usually not speech output). The Invention enables the person or organization in charge of the chatbot(s) to expand its functionality without taking on the burden of rewriting (or reprogramming) the chatbot.

The Invention described herein is typically a computerized system comprising of one or more processors, a network interface, and computer-readable media having stored thereon computer-executable instructions that, when executed, cause the one or more processors to perform the various chatbot functionality upgrade operations described herein.

Alternatively, the Invention may also be a method for performing the various chatbot functionality upgrade operations described herein. It can also be a computer program for instructing a computer to perform the (chatbot upgrade) methods described herein. It can also be a non-transitory computer-readable medium having computer-readable program code for executing the chatbot upgrade methods/operations described herein.

At a high level, these chatbot upgrade operations can comprise maintaining a plurality of communication channels for electronic communication via the network interface; reacting to stimuli coming from the network interface that signal the arrival of telephone or other voice communications; determining the intended terminal of the communication and establishing a processing path appropriate for the terminal.

The chatbot upgrade operations can also comprise processing the voice communication through a voice to text service to transform it into text maintaining the same meaning; sending the resulting text to the intended terminal; and receiving (from the terminal) an electronic message with text and other data to reply to the previously received communication.

The chatbot upgrade operations can also further comprise processing the received message to provide a derived text suitable for rendering through voice; processing the text communication through a text to voice service to transform it into voice; and streaming the resulting voice to the terminal that initiated the exchange through the telephone or other appropriate interface. The operations will typically repeat this process indefinitely until either party terminates the communication.

From now on, we will speak of the telephone network as conduit for the voice part of the interaction processed by the Invention. Note, however, that other types of voice channels (such as different embodiments of VoIP, possibly transmitted by mobile apps) are possible as such conduit and are equivalent to the telephone interface for this Invention. Nothing in this submission depends on the channel used for the voice part of the interaction.

As shown in FIG. 1, the system interfaces typically include:

At least one telephone network [A.02]: The system may use the SIP protocol (Session Initiation Protocol) or other telephony protocols to receive calls from the Public Telephone Network (land- or mobile-based) or from Voice over IP (VoIP)-based apps (including apps such as WhatsApp, FaceTime, and the like) or private switches that may be managing telephone communications at organizations.

One or more speech services [A.04]: The system communicates with publicly or privately available speech services, such as speech-to-text and text-to-speech, to transcribe the users' utterances into text and render the chatbot messages into speech, respectively.

One or more (legacy silent) chatbots [A.06]: The system typically uses the HTTP protocol to signal to a connected chatbot the arrival of a call, provide the chatbot with the text transcription of the users' utterances, and receive the chatbot's messages with the answer text. It also can use the HTTP protocol to receive instructions and data from the chatbot on call handling.

One or more contact centers [A.08]: These are call centers staffed by one or more human operators (or agents). The system uses the preferred method from the contact center software deployed at each service location to forward calls serviced by a chatbot to a human agent who can speak with the user. In addition to the call, the system may also send the context data of the call (if any) to the contact center's human agent.

While transferring streaming voice and data between these interfaces, the system can also manipulate the data as described in the detailed description that follows. These manipulations help to adapt chatbot text communication to be more effective for voice output and optimize voice rendering into chatbot readable text.

Figure 2:
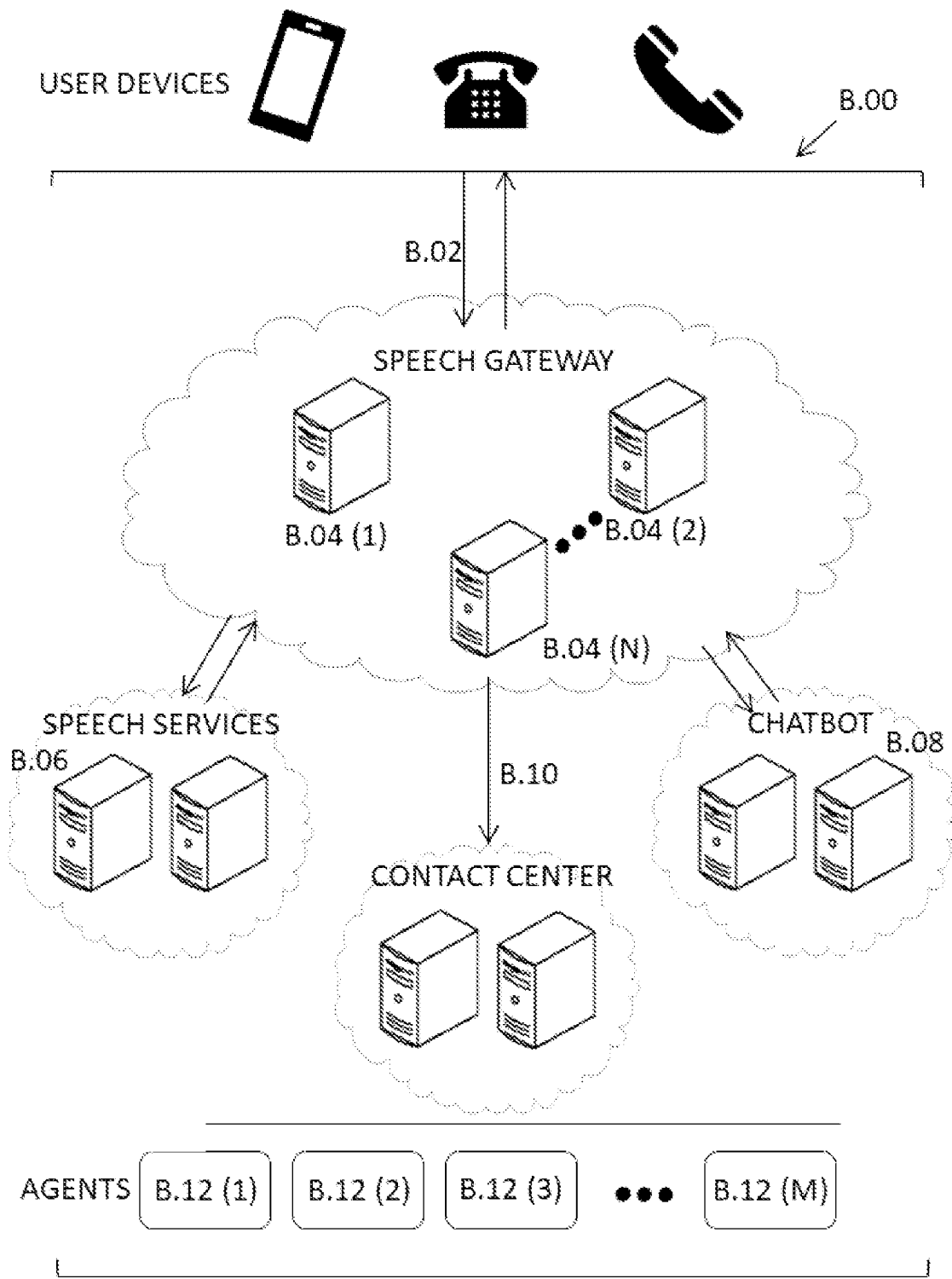
FIG. 2 shows how the Invention enables various user devices (e.g., smartphones, telephones, etc.) to interact with various speech gateway systems, which can interact with multiple chatbots, speech services, and contact services over computer networks (such as the Internet). Here different automated software agents (software modules, to be described) can be configured to allow these disparate systems to work together.

FIG. 2 helps provide further context for the Invention by describing the computational and architectural framework of the supporting system. Systems based on the Invention are typically hosted in a public (commercially available) computing Cloud that can virtualize the processing, network interfaces, and computer-readable media components of the system, separating them from the software part entirely. Modern computing Clouds allow software applications to scale in power and complexity, automatically adding computing nodes, and help maintain applications running at all times by implementing redundancy and error detection.

Such commercially available computing cloud services include the Amazon Web Services (AWS), Google cloud computing services, Microsoft Azure cloud services, Oracle cloud services, and many others. These services generally employ large numbers of networked servers. These servers generally use a plurality of computer processors, which in turn are typically based on one or more ARM, x86 (such as Xeon, EPYC), PowerPC, or other type processor cores. The methods described herein can be implemented using various programming languages, including C++, Go, Java, PHP, Python, Ruby and other languages. Further, the invention may use data representation languages such as XML, VoiceXML (VXML), CCXML, and JSON.

Examples of speech services that may be used with the Invention may include Google Speech Services, Amazon Lex and Polly, Nuance Communications TTS service, Microsoft LUIS, IBM Watson, plus a host of other publicly available services from less known companies, such as Spitch, GoVivace, Speechmatics, and the like.

A user on a device calls a telephone number that corresponds to the system [B.00]. The SPEECH GATEWAY [B.02] comprises telephony access that may, in some embodiments, use a Voice over IP interface to receive the call. The SPEECH GATEWAY can be comprised of a network with a variable number of nodes. As desired, these nodes can be placed in a public Cloud or in a private data center to provide reliability and availability.

Upon the call's reception, the SPEECH GATEWAY may greet the user with a pre-recorded sentence while detecting any energy (corresponding to the beginning of user speech) on the telephony interface.

[a] the SPEECH GATEWAY may stream the input from the voice conversation to the SPEECH SERVICES [B.06] or wait to send to SPEECH SERVICES the entire user utterance, depending on the nature of SPEECH SERVICES. SPEECH SERVICES send back the text transcription of the user utterance to SPEECH GATEWAY.

[b] the SPEECH GATEWAY then sends the transcription of the user's utterance to the CHATBOT [B.08]. This mimics the CHATBOT's normal text interface, such as provided to web-based clients, and CHATBOT replies with the appropriate answer to the SPEECH GATEWAY.

[c] the SPEECH GATEWAY uses the SPEECH SERVICES interface to send the textual answer from the CHATBOT for rendering into speech. The SPEECH GATEWAY receives speech data and streams it to the user over the active telephony interface.

The process comprised of [a], [b], [c] may repeat several times as the user converses with the chatbot, and it may be interrupted by the end of the call (when the user hangs up at the end of the conversation). This process may also be interrupted by the CHATBOT (e.g., if the chatbot determines that it cannot satisfy the user's needs and that the call must be forwarded to a human agent.)

In this case, the CHATBOT uses the interface with the SPEECH GATEWAY to signal that the call must be transferred. The CHATBOT may include the endpoint address that should receive the call, and additional data to move to the human agent. Alternatively, the SPEECH GATEWAY may use information that was pre-set for this use. The SPEECH GATEWAY may send a courtesy message to the user to transfer the calls to CONTACT CENTER [B.10]. This can be done using the CONTACT CENTER's telephony channel and by transferring the call's context information, if any, using the CONTACT CENTER's software interface.

In some embodiments, the Invention may be viewed as a system or method in which the system selects the CHATBOT output to transform into voice. The system can also use a CHATBOT ADAPTOR (which, as will be described in more detail, can be any of a software module or computer implemented device) to adjust this chatbot output using various configuration parameters stored in a common computer-readable media area. This data can be accessible by the organization running the CHATBOT. The CHATBOT ADAPTOR can also be specialized for interaction with a particular chatbot brand or type to adapt to the syntax of the message coming from the CHATBOT. This is shown in more detail in FIG. 3 and FIG. 4.

Figure 3:
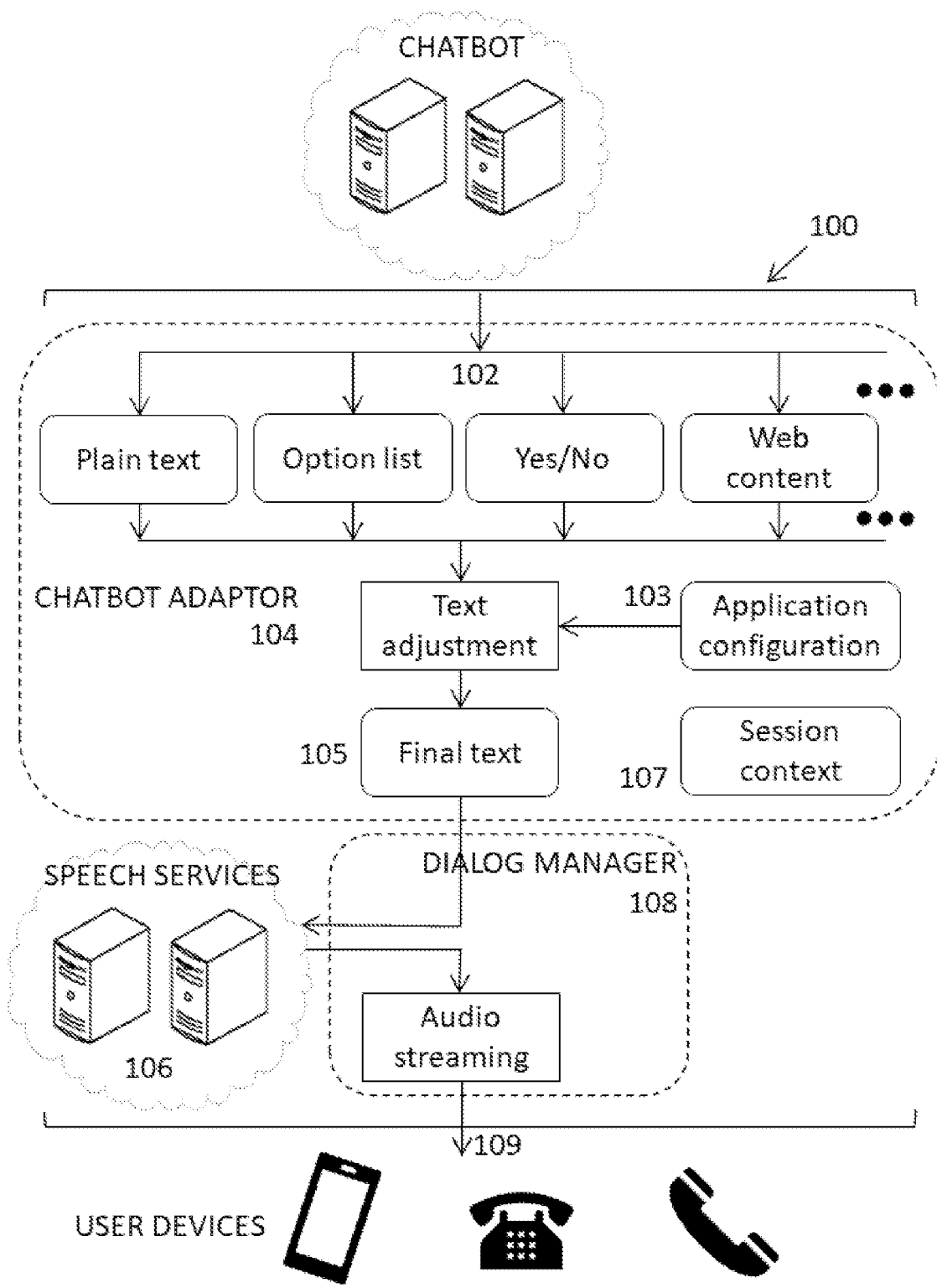
FIG. 3 gives a high-level flow-chart example of how the Invention's various software modules, such as the chatbot adaptor, and the dialog manager, can interface text-oriented chatbots with different user audio devices.
Figure 4:
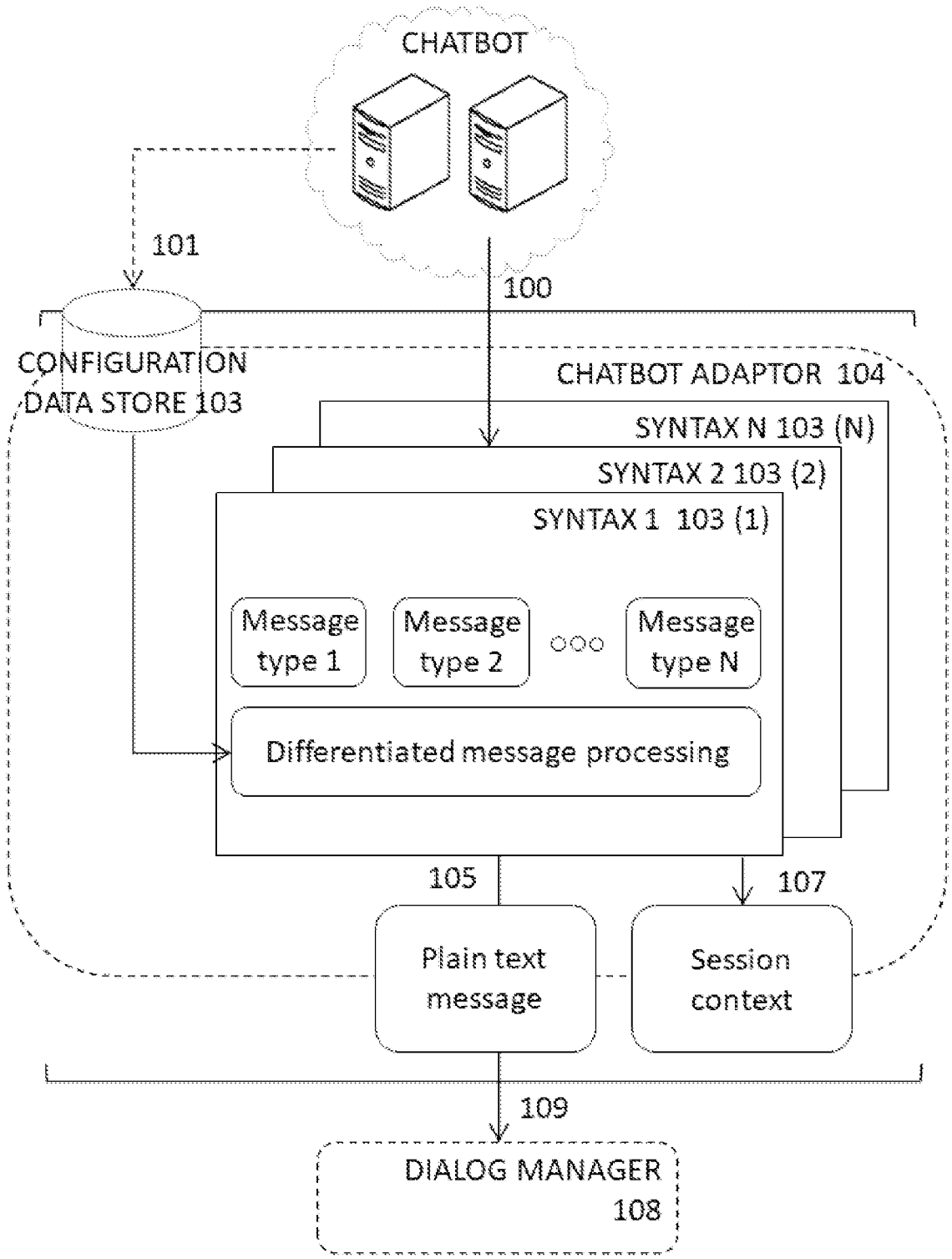
FIG. 4 shows more detail of how the Invention's configuration data store (database 103), syntax modules, and the chatbot adaptor software module can parse (generally text-oriented) output from various chatbots. The Invention can then reformat the output as needed and send this reformatted output to the Invention's dialog manager for further processing and eventual audio output to the user(s).

FIG. 3 and FIG. 4 show the process of interpreting and modifying a chatbot message content that was initially meant to be displayed on a web page but now must be changed to make it suitable for a voice conversation. FIG. 3 illustrates an overview of the process, and FIG. 4 provides more detailed information on how embodiments of the Invention may carry out the operation.

In FIG. 3, the CHATBOT sends a message with web-ready content to the system [100]. The message content may be organized in different ways, depending on the chatbot vendor. To cope with these differences, the CHATBOT adaptor may further contain a software layer [104] with varying configurations for each chatbot vendor. This layer has the role of unpacking the message and interpreting its content for rendering as voice.

As the message comes into the CHATBOT ADAPTOR, it is parsed to determine its type. Several types of chatbot messages are appropriate for a text or web interface, and the system needs to cope with these various types of messages. A non-exhaustive list includes [102]:

Plain text: in this message, the full text to convey to a user is in a single sentence that can also be spoken to the user. No special additional processing is required to convert this message to a format suitable for conversion into voice.

Options list: the user is asked to choose one of several options. For example, what color do you want? red, blue, yellow, or green? The chatbot designer may have originally intended these options as web page buttons that the user may select, but this needs to be adapted for audio sessions. The CHATBOT ADAPTOR may use the initial question coming from the chatbot to start the sentence to be spoken to the user and then add the options by inserting the necessary lexical elements to present them as a list, as directed by the application configuration [103], in order to derive a plain text sentence suitable for conversion into voice.

Binary: a particular case of an option list is the "yes or no" options list that only has two choices. A binary choice is easy for a human to formulate, but very short utterances are problematic for speech recognition software to interpret. The CHATBOT ADAPTOR may substitute longer alternatives for a "yes or no" question to prompt the user to say a phrase with higher recognition percentage, as directed by the application configuration [103]. The output, in this case, is a plain text sentence suitable for conversion into voice, mentioning the alternatives to "yes" and "no" and asking the user to select between the two.

Web content: a text-based chatbot may send an HTTP link to the client application to let users click on it and access additional content. Unfortunately, this is not appropriate for a spoken conversation, and so the CHATBOT ADAPTOR may substitute the link with a plain text sentence coming from the application configuration [103]. The CHATBOT ADAPTOR may also direct the DIALOG MANAGER to use alternative methods, such as a text message, to send the HTTP link to the user's device in parallel with the voice conversation if the user's device is capable of receiving text messages. In this case, the plain text sentence may warn the user to expect a text message with a link.

The result of the processing is a final text [105] that the CHATBOT ADAPTOR sends to DIALOG MANAGER [108] for conversion into spoken voice by use of the SPEECH SERVICES [106].

The CHATBOT ADAPTOR may further save (store in session context memory [107]) the processing that it performed to produce the final text. This may be useful as the conversation continues.

As the SPEECH SERVICES module or device [106] returns the audio content to the DIALOG MANAGER, it is then streamed or otherwise output to the user's audio device [109].

As shown in FIG. 4, before commencing operation, the CHATBOT software may be configured by setting some parameters [101] into a common CONFIGURATION DATA STORE [103] that together may direct how the CHATBOT ADAPTOR [104] processes messages from the CHATBOT. As the CHATBOT sends a message during a session [100], the CHATBOT ADAPTOR may select the syntax rules that pertain to the particular CHATBOT [103 (1) . . . (N)] and populate them from the appropriate section of CONFIGURATION DATA STORE.

The syntax rules may cover several types of CHATBOT messages, leading to the CHATBOT ADAPTOR eventually creating a Plain text message [105] through differentiated message processing. At the same time, the CHATBOT ADAPTOR may also save a record of the processing used to create the plain text message into the session context memory or data store [107].

Further, the CHATBOT ADAPTOR may send the Plain text message [109] to the DIALOG MANAGER [108] for speech conversion.

In some embodiments, the type of the intended next communication from the telephone channel can be used to select among various possible speech-to-text services. In this case, the system may consider the performance of the different speech-to-text services to interpret the expected next utterance from the user and pick the most suitable speech-to-text engine for the next communication.

This is discussed in more detail in FIG. 5 and FIG. 6 below.

Figure 5:
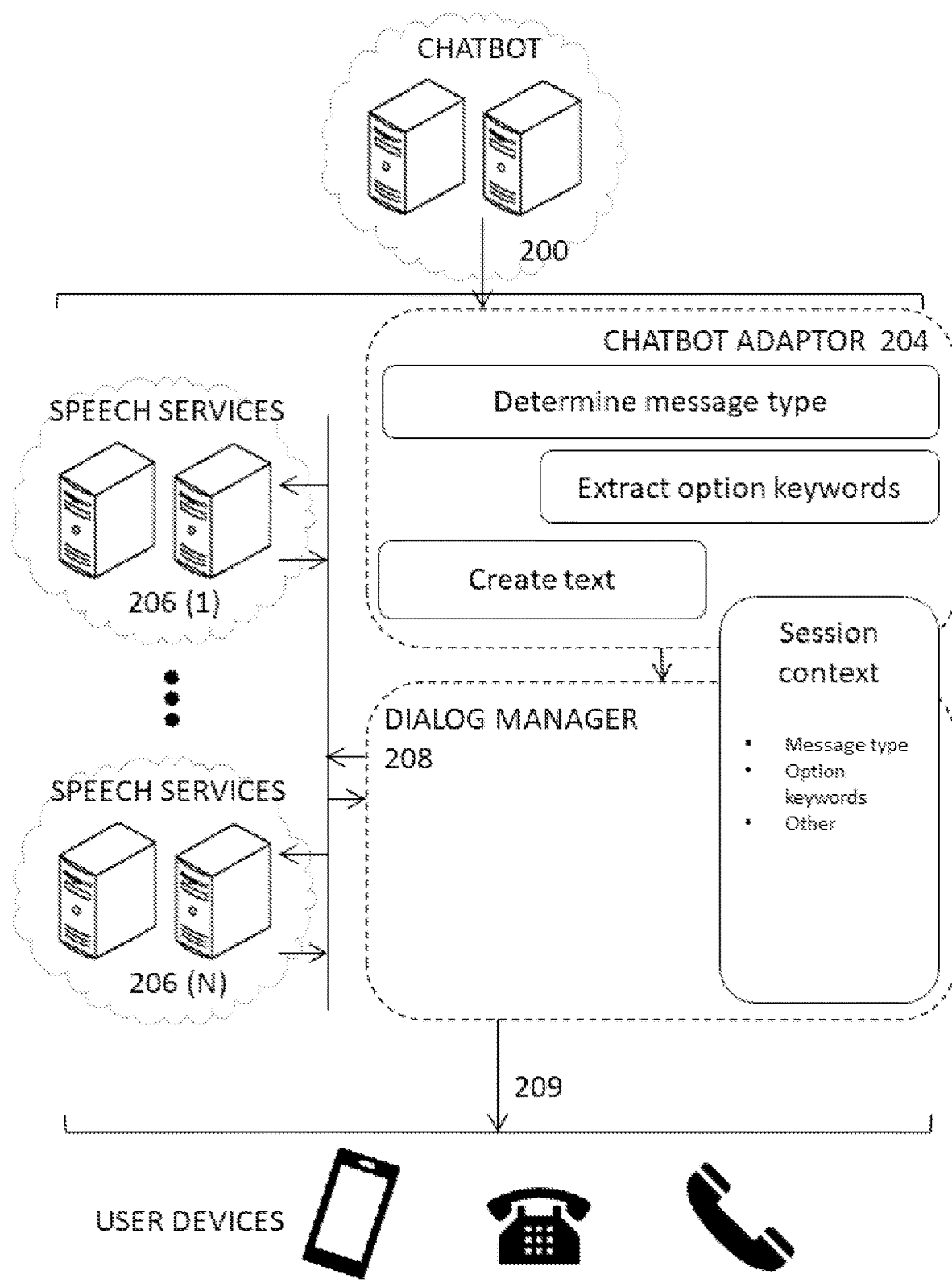
FIG. 5 shows how the Invention's chatbot adaptor (204) and dialog manager software modules interact with various chatbots, various speech services, and different user audio devices.
Figure 6:
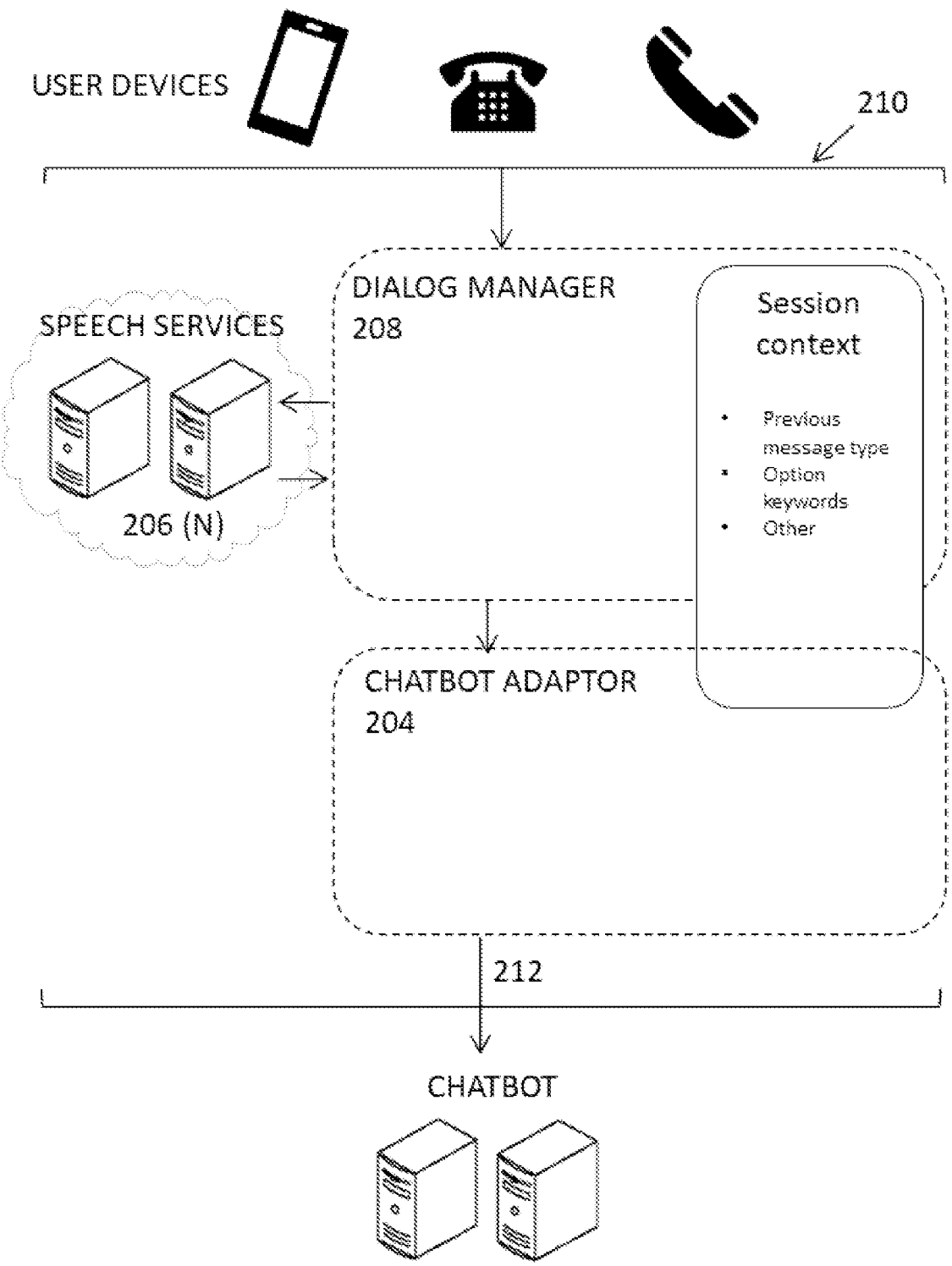
FIG. 6 shows more detail of how the Invention can use session context data to operate.

FIG. 5 and FIG. 6 illustrate the process by which some embodiments of the Invention may increase the performance of understanding the answer to a message from the CHATBOT by asking the user to choose from a limited number of options. Here the system can select the most appropriate SPEECH SERVICE for the message type and provide the SPEECH SERVICE with a list of terms (a grammar in standard industry terminology) that includes the options expected by the CHATBOT.

FIG. 5 shows sending the message (text and graphics) from the CHATBOT to the user. FIG. 6 refers to the process of capturing the (initially audio) user response and processing it to convert it to the correct format expected by the CHATBOT.

In FIG. 5, the CHATBOT sends a message with part of a conversation [200] to the CHATBOT ADAPTOR [204]. Note that in some embodiments, it may be helpful to consider the CHATBOT ADAPTOR to have a CHATBOT to USER module, as well as a USER to CHATBOT module.

The CHATBOT ADAPTOR analyzes the message to determine its type. If the message asks the user to choose from several options, the adaptor can extract the keywords associated with the options and save them in session context memory. The CHATBOT ADAPTOR can then create the text to be spoken to the user and send it to the system's DIALOG MANAGER [608]. The DIALOG MANAGER, in turn, can run this text through a suitable SPEECH SERVICES interface [206(1) . . . (N)] to transform the text into streaming speech. The dialog manager can then transmit this speech to the user [209].

In FIG. 6, the user responds to the sentence sent previously [210]. Depending on the message type, the user may either pick one of the options (if the message is of a type that includes options), or the user may say (utter) something else.

In either case, the DIALOG MANAGER [208] receives the user's utterance and selects the best SPEECH SERVICE [206(N)] for recognition, based on the message type. Suppose the message had options associated with it (as shown by the session context memory). In that case, the DIALOG MANAGER may further prompt the SPEECH SERVICE with a grammar containing the expected option text. This increases the chances that the system will recognize the option selected by the user.

The DIALOG MANAGER receives back the text spoken by the user from SPEECH SERVICE, which may with high probability match one of the options stored in the session context memory. In the case of option recognition, the DIALOG MANAGER sends the reference of the selected option back to CHATBOT ADAPTOR [204]. The CHATBOT ADAPTOR, in turn, fashions the message to the CHATBOT [212] with the recognized option and sends it with the unambiguous indication of the chosen option, which, depending on the CHATBOT interface, may be simply a number (e.g., option 2).

In some embodiments, the Invention can also function with visual or graphical chatbot input and output. This embodiment is shown in more detail in FIG. 7 below.

Figure 7:
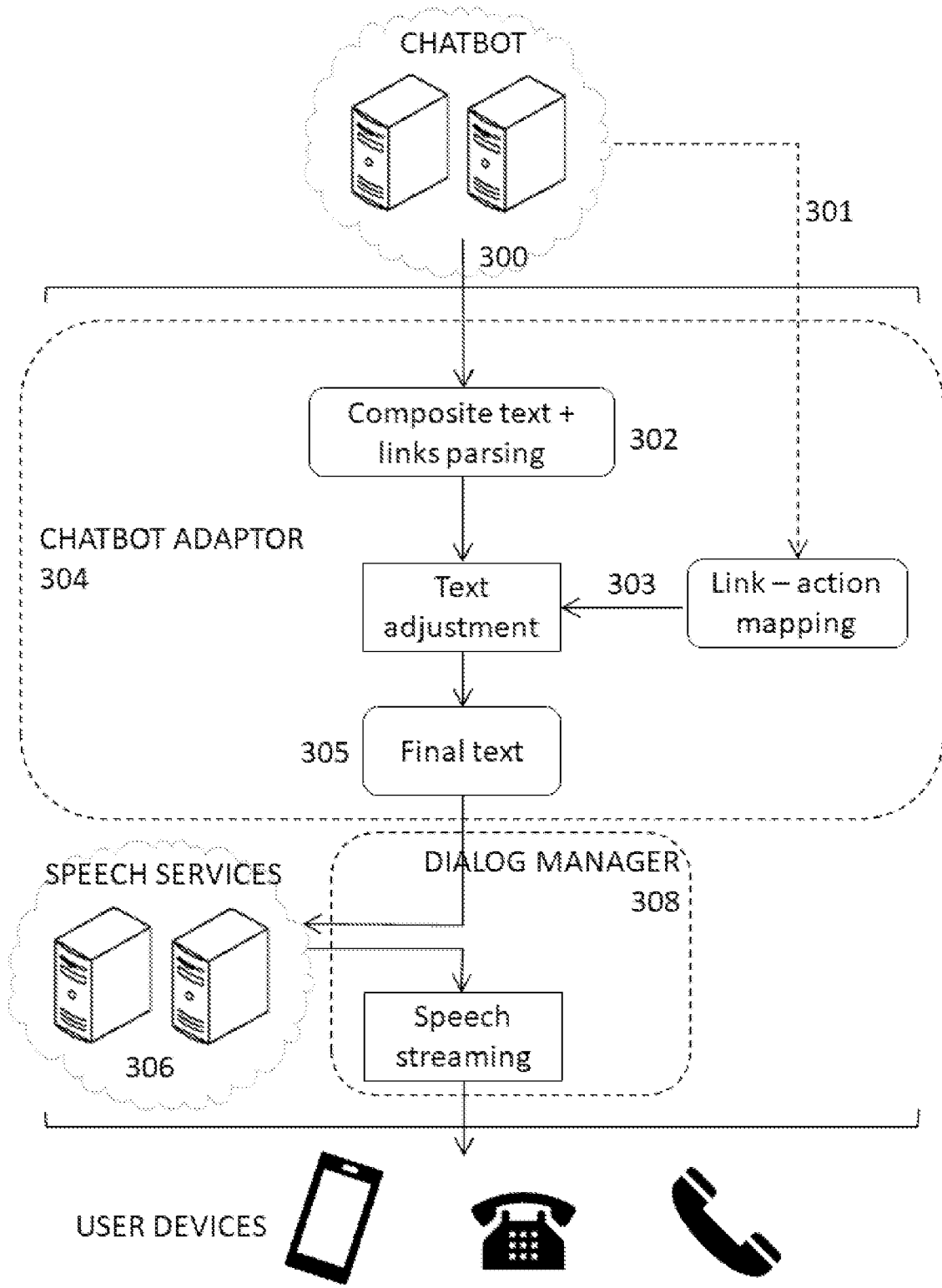
FIG. 7 shows more detail of how the Invention's chatbot adaptor software module can operate.

FIG. 7 illustrates how the Invention may operate when it receives images or visual elements that the chatbot had initially intended to be output on a web interface. Here, the Invention may process the complete message to render the graphic elements into corresponding speech automatically.

For example, as the CHATBOT sends a message into the system [300], part of the message may include one or multiple [HTTP] link(s) to images or interactive visual elements that CHATBOT usually would have output in a graphical user interface type interaction with the user. (For example, an interactive visual element can represent a calendar configured to let the user click on a date.) As this type of message arrives at the CHATBOT ADAPTOR [304], it may be parsed [302], to detect any HTTP links included in the message. The CHATBOT ADAPTOR may then check [303] whether these HTTP link(s) were included in a mapping contained in a commonly accessible memory area. This is a memory area that CHATBOT personnel may have used to configure the system, and this can be designed to include machine-readable instructions on how to change processing in conjunction with a given HTTP link [301].

The CHATBOT ADAPTOR may use the supplemental instructions to adjust the message's text, including interrupting processing and inserting pre-set text or instructions, or handing the processing to an embedded sub-dialog that will converse with the user to return information to the chatbot. This provides the final text [305] that is handed over to the DIALOG MANAGER to be converted into speech by the SPEECH SERVICES [306] and streamed to the user. Additional details on the Invention's processing of this case are provided in FIGS. 13A and 13B.

In some embodiments, the Invention may also provide a system or method to handle various asynchronous events (which often occur in voice conversations) without affecting the text-based chatbot on the other end. Such asynchronous events are often problematic because they can disrupt the flow of the conversation. However, Invention can absorb such asynchronous messages into the synchronous flow between the party sending the text and the system converting the text into speech. This solves these asynchronous event problems before they are transmitted to the chatbot, thus enabling the user to continue conducting an overall synchronous conversation with the chatbot channel. This method of coping with asynchronous messages is shown in more detail in FIG. 8.

Figure 8:
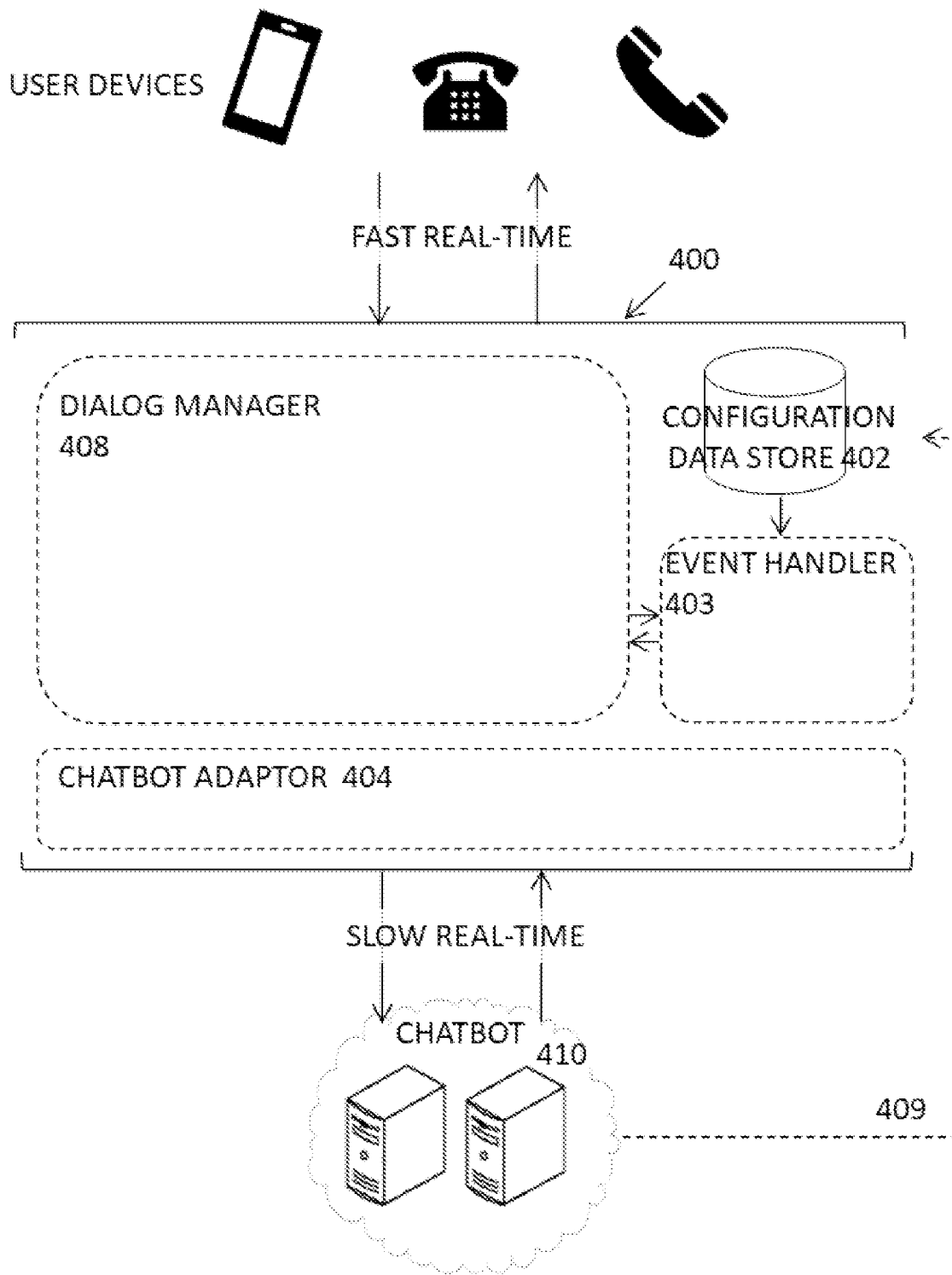
FIG. 8 shows more detail of how the Invention's dialog manager software module can operate.

It is important to point out that, compared with the chatbot channel, the telephone channel has more stringent timing requirements. FIG. 8 notes this by labeling the telephone channel as FAST REAL-TIME and the chatbot channel SLOW REAL-TIME. The methods illustrated in FIG. 8 act to bridge the differences between fast and slow real-time.

As an event occurs in the system, it is detected by the EVENT HANDLER [403]. By way of example, events may include bad telephone connection quality, silence on the telephone line for more than a pre-set interval, the call being put on hold, the chatbot failing to send a response for more than a pre-set time, and loss of connectivity with the chatbot. The EVENT HANDLER may consult the CONFIGURATION DATA STORE [402], which may have been configured previously [409] by CHATBOT [410] personnel.

The EVENT HANDLER may instruct DIALOG MANAGER [408] to act according to the nature of the event that occurred using the instructions it had gathered from the CONFIGURATION DATA STORE. Some embodiments of the Invention may act in different ways to keep the conversation alive in the face of such telephone connection issues (occurring events). For example, some embodiments may play a cached message to the user or switch the transfer of information to separate channels.

In some embodiments, the Invention may also be a system or method in which the voice communication preferred language is inferred by querying the user. If the user voice language is different from the language of the chatbot text communication, the system may start automatic translation between the two languages. This automatic translation lets the party using voice to communicate with the party using text, irrespective of language. This embodiment is shown in more detail in FIG. 9.

FIG. 9 illustrates the process by which some embodiments of the Invention may provide translation from one language to another to chatbots supporting a single language.

As the user talks into a device, the resulting streaming audio is delivered to the system [500]. The audio is received by the DIALOG MANAGER [502]. The DIALOG MANAGER may, for example, automatically ask the user what the preferred language of the communication is [501].

The initial language of communication can be selected based on session context and configuration parameters. However, once the user selects a(nother) language, this alternate language will typically be used throughout the session. Based on the language selected by the user, the DIALOG MANAGER determines the correct SPEECH TO TEXT [506] parameters and service to use for transcribing the user's speech into text.

The user's speech is then sent to the selected SPEECH TO TEXT service and returned as text in the selected language. The DIALOG MANAGER sends the text to the TRANSLATION MANAGER [503], together with the origin language identifier. The TRANSLATION MANAGER invokes a MACHINE TRANSLATION [510] service with the same text, receiving the translated text back.

The TRANSLATION MANAGER provides the text to the CHATBOT ADAPTOR [504], which constructs the message to send to CHATBOT [508] according to the session context.

The CHATBOT may send an answer message to the CHATBOT ADAPTOR, which may be of any of the types mentioned in FIG. 5 and FIG. 6 (FIG. 2). If the message is of type "Option list" or "Yes/no," the CHATBOT ADAPTOR can include these options, along with the text, to the TRANSLATION MANAGER. The TRANSLATION MANAGER caches these options in the session context before invoking the inverse MACHINE TRANSLATION service.

TRANSLATION MANAGER also stores the translated options when it receives the translation from the MACHINE TRANSLATION and sends the received text to the DIALOG MANAGER.

The DIALOG MANAGER sends the received text to the TEXT TO SPEECH [512] service, receives the corresponding audio, and plays it on the telephone connection to the user.

If the audio implies an "Option list" or "Yes/no" message from the CHATBOT, the user will likely utter one of the suggested options. In this case, during the next user-to-chatbot message, the TRANSLATION MANAGER compares the received text from the user with the cached alternatives. If one of the cached choices matches the incoming text, the TRANSLATION MANAGER does not send the audio for machine translation. Instead, it sends the CHATBOT language matching option to the CHATBOT ADAPTOR for forwarding to the CHATBOT.

FURTHER DISCUSSION OF CERTAIN HARDWARE AND SOFTWARE ASPECTS OF THE INVENTION

As previously discussed in FIG. 3 and FIG. 4, in some embodiments, the Invention may be a method for which the text to transform into voice is selected and adjusted from a variety of configuration parameters stored in a common computer-readable media area. These options can be accessed by the party sending the text and can be adapted to the syntax of the message coming from the application generating the text through a CHATBOT ADAPTOR specialized for interaction with a particular chatbot brand or type.

More specifically, as shown in FIGS. 10a to 10d and FIG. 11, in some embodiments, the Invention may be a system or method of automatically converting chatbot output text messages from a plurality of different chatbot types (at least some of which will be legacy silent chatbots) and a plurality of different text message types to voice output for a user. Expressing the concept in methods format, this method may use a text-to-audio chatbot adaptor software module (or device), at least one computer processor, and computer memory to operate on a received chatbot output text message. The Invention will determine a chatbot type and a chatbot output text message type and store the chatbot output text message type in memory as session data. Typically, as shown in FIG. 10A to FIG. 10D, for each chatbot type and chatbot output text message type that is not a complex HTTP message type, the Invention will perform at least one (and typically any of) the following steps.

Figure 10A:
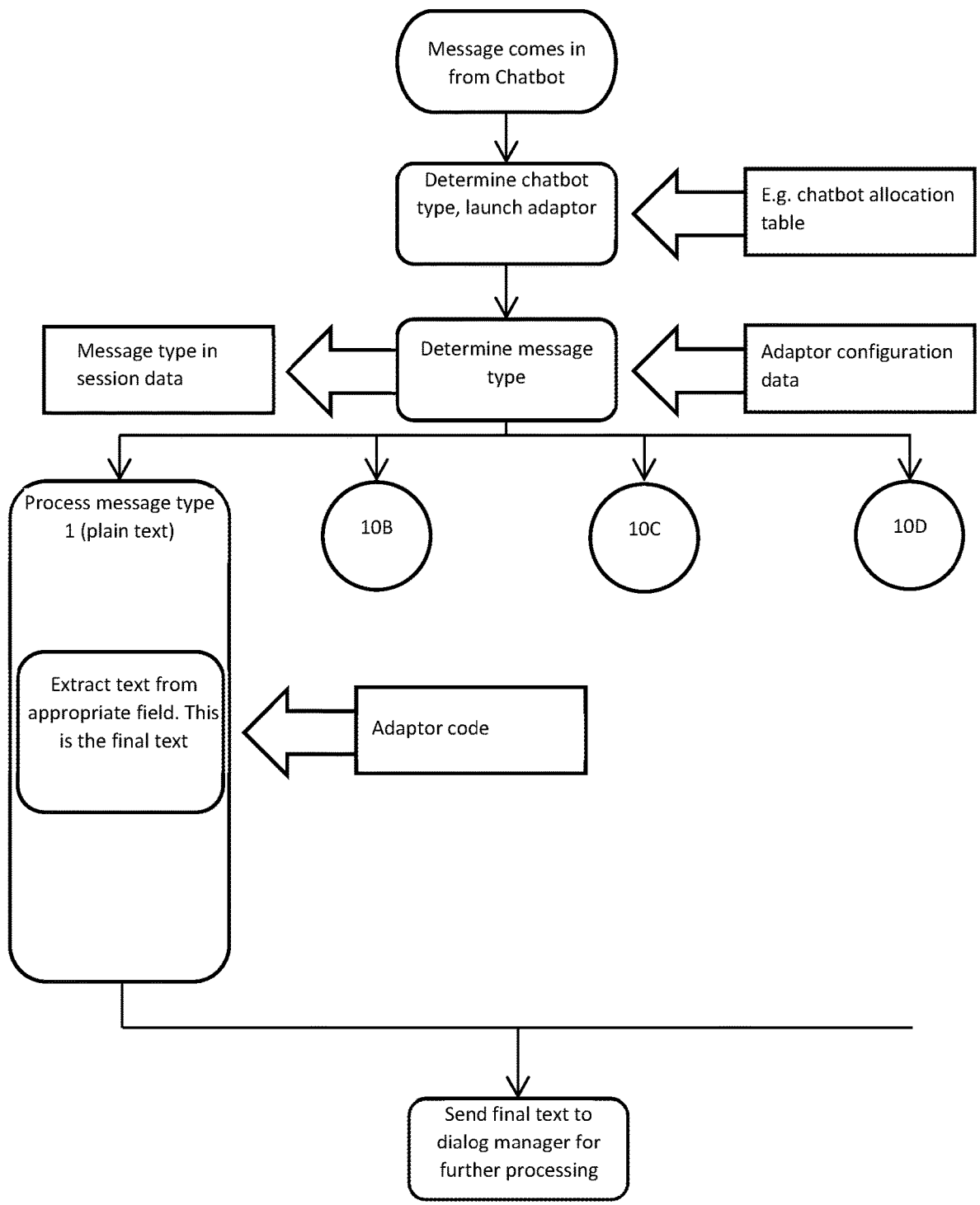
FIG. 10A shows a first more detailed flow-chart of how the Invention's chatbot adaptor operates.

As shown in FIG. 10A, the Invention may use the chatbot type and message type to extract payload text from the chatbot output text message, thereby creating dialog manager input text.

To do this, a text-to-audio chatbot adaptor software module (or device) may further comprise at least one adaptor code configured to determine which fields of a given message type comprise this payload text. This module may then retrieve the message type from the session data and use the previously determined chatbot type and message type to select at least one adaptor code, producing a chosen adaptor code. This software module can then use this chosen adaptor code to extract the payload text from the chatbot output text messages.

Alternatively, or additionally, as shown in FIG. 10B, when the message type comprises a plurality of option fields, the Invention will extract question text from each option field containing question text, thereby creating a plurality of extracted option question texts, and store these option fields in memory as session data. The Invention will then use these extracted option question texts to construct a full options message text, thereby creating dialog manager input text.

To do this, the text-to-audio chatbot adaptor software module (or device) can further comprise at least one set of chatbot-specific message parsing and lexical glue rules. The Invention can then use the previously determined chatbot type to retrieve these chatbot-specific message parsing and lexical glue rules. Once retrieved, the Invention can then use these chatbot-specific message parsing and lexical glue rules to construct the full options message text.

Alternatively, or additionally, as shown in FIG. 10C, when the message type comprises yes-no option type messages, the Invention will extract yes-no question text from each option field, thereby creating a plurality of extracted yes-no alternative texts, and store these yes-no options in memory as session data. The Invention will then use this plurality of extracted yes-no alternative texts to construct a full yes-no message, thereby creating dialog manager input text.

To do this, the text-to-audio chatbot adaptor software module (or device) can further comprise at least one chatbot-specific set of yes-no message parsing and yes-no alternative lexical glue rules. The Invention can then use the previously determined chatbot type to retrieve these chatbot-specific yes-no message parsing and yes-no alternative lexical glue rules. The Invention can then use these chatbot-specific yes-no message parsing and yes-no alternative lexical glue rules to construct the full yes-no message.

Alternatively, or additionally, as shown in FIG. 10D, when the message type comprises an HTTP link, the Invention may use this HTTP link as input into a HTTP link conversion table (previously stored in memory, often as system configuration data), determine an HTTP-corresponding text, and use this HTTP-corresponding text to create dialog manager input text.

To do this, this previously-stored HTTP link conversion table may typically comprise a plurality of chatbot-specific HTTP link conversion tables, each containing chatbot-specific default text.

Here, the Invention can use the previously determined chatbot type to select a HTTP link conversion table as well as to select a chatbot-specific default text from memory optionally. The Invention can then use the selected HTTP link conversion table as the HTTP link conversion table and use this chatbot-specific default text as a default text. Here if no HTTP-corresponding text can be determined from the table, the Invention can instead automatically use the default text as the dialog manager input text, which for instance, may direct the user to visit a relevant website.

Figure 11:
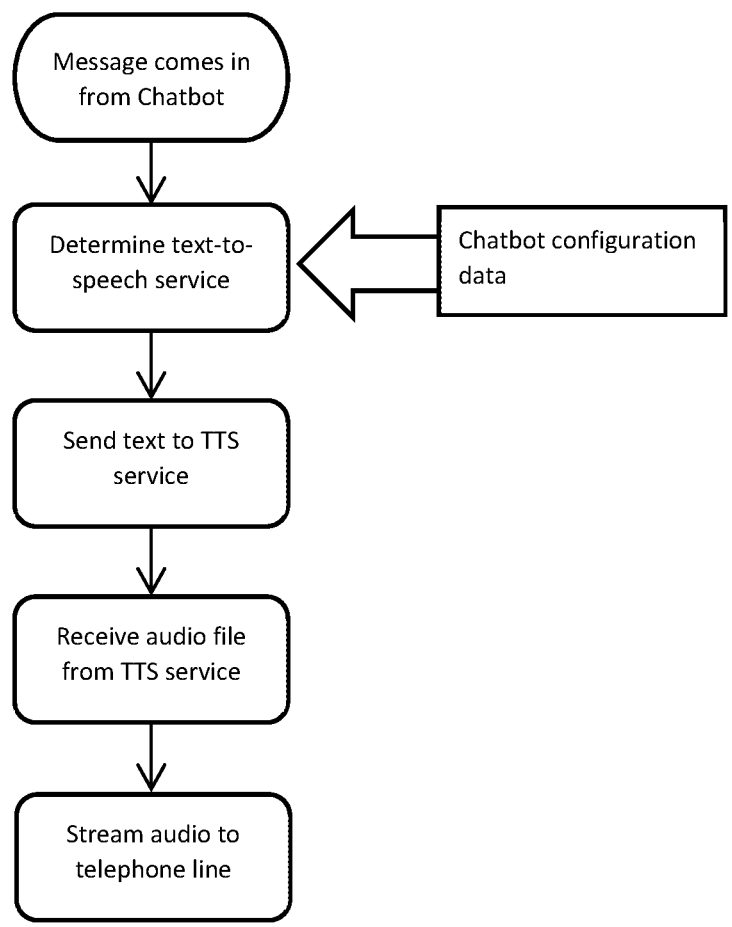
FIG. 11 shows a detailed flow-chart of how the Invention's dialog manager operates.

As shown in FIG. 11, after the text-to-audio chatbot adaptor software module has created this dialog manager input text, the Invention will typically use a dialog manager software module to handle the remaining stages in the process. This dialog manager software module may, for example, take the dialog manager input text, as well as the chatbot configuration data corresponding to the relevant chatbot type to output a corresponding audio file. The dialog manager typically does this by selecting an automated text-to-speech service. The dialog manager then uses this selected automated text-to-speech service to produce an output audio file corresponding to the dialog manager input text. The dialog manager can then automatically output this output audio file.

As previously discussed in FIG. 5 and FIG. 6, in some embodiments, the Invention may also be a system or method for which the type of the intended next communication from the telephone channel is used to select the service transforming the next speech content into text among the possible services, considering the known performance of the different services in regard of communication type.

More specifically, as shown in FIG. 12, in some embodiments, the Invention may be a system or method for further converting user audio speech content into text for a target chatbot selected from a plurality of different chatbots. In this embodiment, the Invention can use the previously determined chatbot configuration data for the target chatbot and any session data from a previous chatbot message with that particular user to select a preferred speech-to-text service from a plurality of different speech-to-text services. In situations where the latest chatbot message consists of a set of options, the Invention can operate by automatically generating a set of instructions for the speech-to-text service to determine (with higher certainty) the meaning of the user's utterance among a set of expected user utterances. By knowing the latest set of options, the system can anticipate that the user is likely to respond according to these expected user utterances. The system can then use the previously selected preferred speech-to-text service and this set of likely user utterances to interpret the actual user utterance and produce raw chatbot input text. The system can then use a syntactic chatbot adaptor software module to process this raw chatbot input text and make a chatbot-ready input message. The system can then transmit this chatbot-ready input message to the target chatbot.

Regarding the use of grammar methods for speech interpretation:

In the speech-to-text field, a "grammar" is a set of pre-determined meanings of a given utterance, from which the speech-to-text engine can choose. (This can be understood as being equivalent to selecting one of a number of options). Using a grammar greatly enhances the speech-to-text engine's probability of understanding an utterance correctly since it narrows the number of options. So, if the chatbot's message requires the user to pick a choice among a finite number, the Invention can use the above process to improve accuracy.

Although many speech-to-text engines support grammar-enhanced speech recognition, some do not. So, the Invention can't always assume that any given speech-to-text engine will support grammar-enhanced speech recognition. Here, however, the system can use the fact that the user is responding to the last sent series of options to better understand the user utterances in response to these options by selecting an appropriate speech-to-text engine.

Here, the "syntactic adaptor" can be a software module that interprets the user's utterances after these utterances have already been analyzed by whichever speech-to-text engine was used. Thus, the syntactic adaptor must take whatever text that particular speech-to-text engine generates, and (based on the knowledge of the options that the user is responding to), convert or map this "raw" speech-to-text engine output into whatever that particular chatbot is expecting as syntax.

As previously discussed in FIG. 7, in some embodiments, the Invention may be a method for transforming visual elements (often referred here to as "HTTP complex messages") contained in a chatbot message into voice by causing the system to perform actions as controlled by a common computer-readable media area accessible by the party sending the message. An example of an HTTP complex message can be a user-fillable calendar, for example. This calendar may have various HTTP elements corresponding to the visual aspects of a calendar.

Figure 13A:
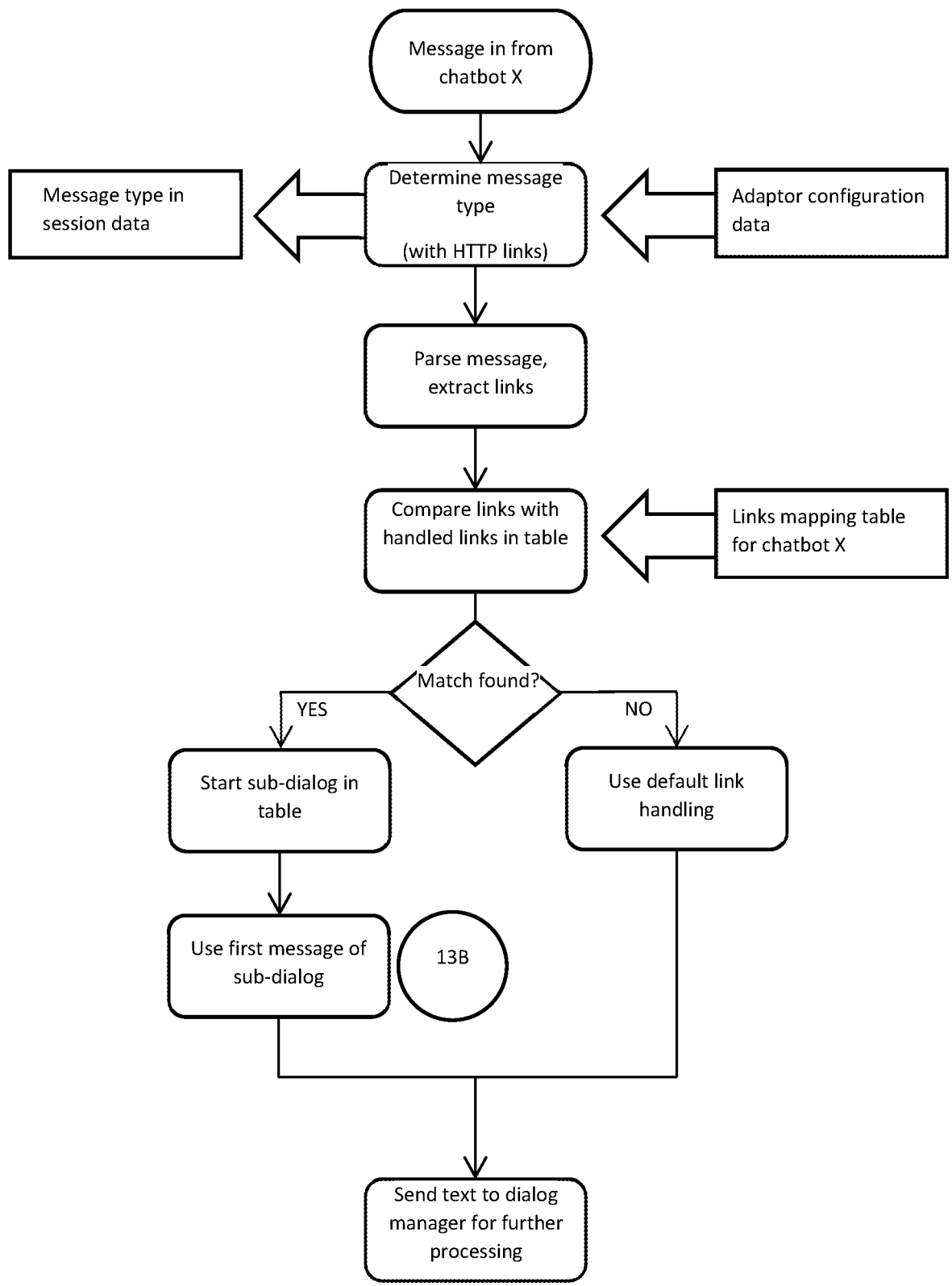
FIG. 13A shows a flow-chart of how a system based on the Invention can handle an HTTP complex message (such as a calendar).
Figure 13B:
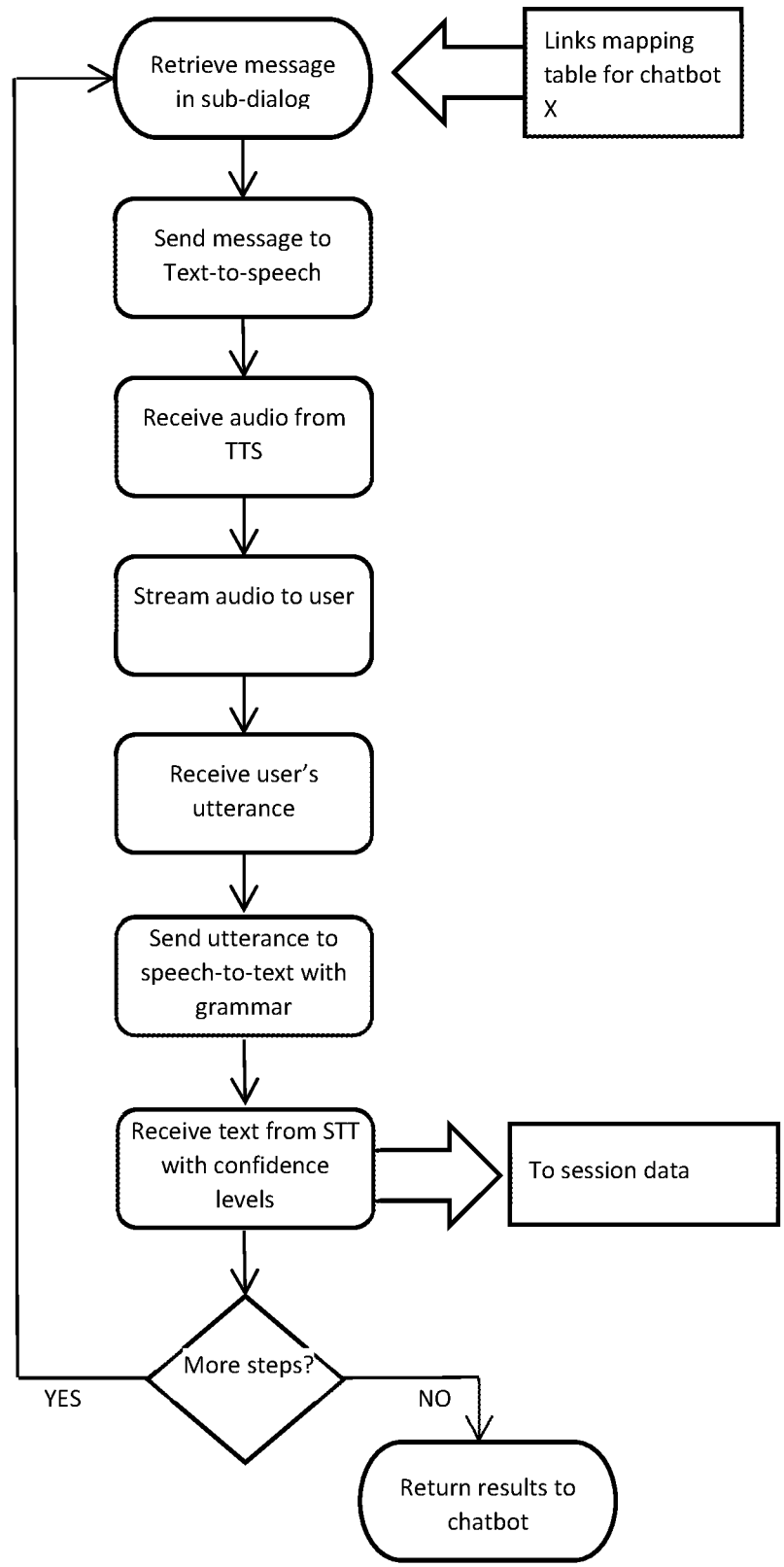
FIG. 13B shows a flow-chart showing how a system based on the Invention can use sub-dialog methods to process an HTTP complex message automatically.

More specifically, as shown in FIGS. 13A and 13B, in some embodiments where the chatbot output text messages further comprise a chatbot HTTP complex text message, the method can further comprise processing these HTTP complex text messages as per the steps below. There the system can use the previously determined chatbot type to parse the chatbot HTTP complex text message and determine its HTTP links. The system can also analyze these HTTP links by using a (previously established) link mapping table corresponding to that particular chatbot type and one or more sub-dialogs in (or from) this link mapping table corresponding to these HTTP links.

Here, the system can generate a detail-dialog with the user for each HTTP link where a link matching table dialog is found. For example, the system can use this detail-dialog to create dialog manager input text and use the dialog manager and the previously selected automated text-to-speech service to output this dialog manager input text to the user as a "detail-dialog audio file."

The system can then receive a detail-dialog audio response to the detail-dialog audio file from this user. Here, this detail-dialog audio response is called the "detail audio speech content." The system can then use this detailed audio speech content to produce the detailed chatbot-ready text corresponding to this different HTTP link. In a preferred embodiment, this process can continue until all the various HTTP link matching table dialogs have been received.

Then, when all the HTTP link matching table dialogs have been obtained, the system can assemble the detailed chatbot-ready text corresponding to these different HTTP links into an overall text response to the chatbot HTTP complex text message.

As a specific example, note that FIG. 13B focuses on processing an HTTP complex message using sub-dialog methods. This sub-dialog is based on the previously described grammar methods. It proceeds as a back-and-forth with the user to ascertain complex information without involving the chatbot's conversational AI.

Example: day and hour specification. The chatbot visual interface can use a single HTTP widget (characterized by a mapped link), translating into the following dialog. Here the Invention's questions are shown in italic, and the user response is shown in brackets.

What day of the week do you prefer? [Friday]
This could be November 27, December 4, December 11? Which one works for you? [December 4]
And at what time? [3 pm]
OK, I have you down for Friday December 4 at 3 pm. Please confirm that this is OK [Yes, it's OK]

Now a system based on the Invention can send the time specification back to the chatbot.

In FIG. 13B, this description is provided with reference to the accompanying figures. The left-most digit(s) of a reference number identifies the figure in which the reference number first appears in the figures. The same reference numbers in different figures indicate similar or identical items.

As previously discussed in FIG. 8, some embodiments of the Invention may include a method for which events that may occur asynchronously within the flow of a voice conversation are absorbed into the synchronous flow between the party sending the text and the system converting the text into speech.

Figure 14:
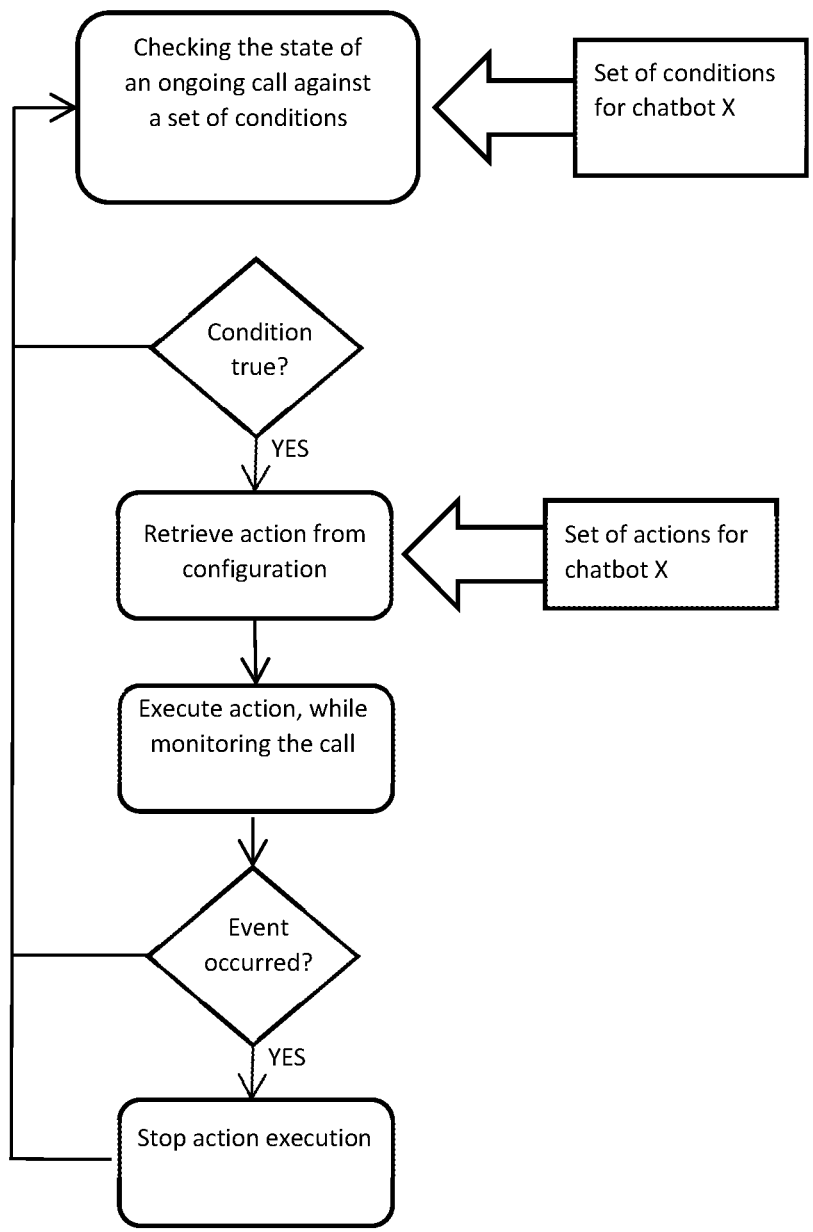
FIG. 14 shows a flow-chart of how the Invention envisions an error-handling process (agent) that can start when the call begins. This software agent can monitor the state of the call for adherence to a set of (configuration-defined) conditions and events.

More specifically, as shown in FIG. 14, in some embodiments, the Invention may further automatically correct for error conditions, call transfers, or terminations as follows:

When the chatbot output text message is delayed beyond a chatbot response time threshold, the system can automatically substitute a preconfigured chatbot delayed message for the (delayed) chatbot output text message.

When the user audio speech content is delayed beyond a user speech delay time threshold, the system can automatically output an unexpected user pause audio file (e.g., a prompt for the user to speak).

When audio noise is detected in the user audio speech content, and the user audio speech content cannot be interpreted, the system can output a line noise warning audio file (e.g., "I'm sorry, I didn't get that") to the user.

When the chatbot transfers the operation to a human agent, the system can automatically output a call transfer audio file (e.g., "Please hold while I get the operator") message.

When the chatbot terminates its connection, the system can automatically output a call termination audio file to the user (e.g., "Thank you for calling, please call back if you have further questions.")

FIG. 14 shows how the above automatic corrections can be implemented by a process (software agent) that starts when the call starts. This process can monitor the state of the call for adherence to a set of (configuration-defined) conditions and events. If any of the conditions become true, the agent can trigger the corresponding (configuration-defined) action.

These error conditions can be possibly (but not exclusively) related with the different levels of real-time feedback required for voice and chat conversations. These examples include:

Chatbot takes a longer time than a threshold to get back to user (speak a pre-recorded message)
User does not speak for a longer time than a preset threshold (speak a pre-recorded message)
Bad voice line quality (speak a pre-recorded message)
Chatbot transfers the call to a human agent (announce the transfer with a pre-recorded message)
Chatbot terminates the connection, or an error occurs (speak a pre-recorded message)

The invention claimed is:

1. A method of automatically converting legacy silent chatbot output text messages from a plurality of different chatbot types and a plurality of different text message types to voice output for a user, said method comprising:
using a text-to-audio chatbot adaptor software module, at least one computer processor, and computer memory to:
receive a chatbot output text message;
determine a chatbot type and a chatbot output text message type;
storing said chatbot output text message type in memory as session data;
for each said chatbot type and said chatbot output text message type that is not a complex HTTP message type, using said chat output text message to obtain any of dialog manager input text and session data;
after said dialog manager input text has been created by said text-to-audio chatbot adaptor software module, using a dialog manager, said dialog manager input text, and chatbot configuration data corresponding to said chatbot type to:
select an automated text-to-speech service;
use a selected said automated text-to-speech service to produce an output audio file corresponding to said dialog manager input text; and
automatically outputting said output audio file.

2. The method of claim 1, wherein said text-to-audio chatbot adaptor software module further comprises at least one adaptor code configured to determine which fields of a given message type comprise payload text;
retrieving said message type from said session data, and using said chatbot type and message type to select said at least one adaptor code, thereby producing selected adaptor code;
wherein said method further uses said selected adaptor code to extract payload text from said chatbot output text messages.

3. The method of claim 1, wherein using said chat output text message to obtain any of dialog manager input text and session data is done by performing any of:
a) using said chatbot type and message type to extract payload text from said chatbot output text message, thereby creating dialog manager input text; or
b) when said message type comprises a plurality of option fields, extract question text from each option field containing question text, thereby creating a plurality of extracted option question texts, and storing said option fields in memory as session data;
using said plurality of extracted option question texts to construct a full options message text, thereby creating dialog manager input text; or
c) when said message type comprises yes-no option type messages, extract yes-no question text from each option field, thereby creating a plurality of extracted yes-no alternative texts, and storing these yes-no options in memory as session data;
using said plurality of extracted yes-no alternative texts to construct a full yes-no message, thereby creating dialog manager input text; or
d) when said message type comprises an HTTP link, use said HTTP link as input into a HTTP link conversion table stored in memory, determine an HTTP-corresponding text, and use said HTTP-corresponding text to create dialog manager input text.

4. The method of claim 3, wherein said text-to-audio chatbot adaptor software module further comprise at least one chatbot-specific message parsing and lexical glue rules;
using said chatbot type to retrieve said chatbot-specific message parsing and lexical glue rules; and
further using said chatbot-specific message parsing and lexical glue rules to construct said full options message text.

5. The method of claim 3, wherein said text-to-audio chatbot adaptor software module further comprise at least one chatbot-specific yes-no message parsing and yes-no alternative lexical glue rules;
using said chatbot type to retrieve said chatbot-specific yes-no message parsing and yes-no alternative lexical glue rules;
further using said chatbot-specific yes-no message parsing and yes-no alternative lexical glue rules to construct said full yes-no message.

6. The method of claim 3, wherein said HTTP link conversion table is plurality of chatbot-specific HTTP link conversion tables, each containing chatbot-specific default text;
further using said chatbot type to select a selected HTTP link conversion table and select a chatbot-specific default text from memory;
using said selected HTTP link conversion table as said HTTP link conversion table, and using a selected said chatbot-specific default text as a default text; and
wherein if no HTTP-corresponding text is determined, using said default text as said dialog manager input text.

7. The method of claim 1, further converting user audio speech content into text for a target chatbot selected from a plurality of different chatbots, said method further comprising:
using said chatbot configuration data for said target chatbot, and any said session data from a previous chatbot message with said user, to select a preferred speech-to-text service from a plurality of different speech-to-text services
in case said previous chatbot message consisted of a set of options, generating a set of instructions for said preferred speech-to-text service to determine with high certainty at least one meaning of a user utterance among a set of expected user utterances, thus determining a set of likely user utterances;
using said preferred speech-to-text service and said set of likely user utterances to produce raw chatbot input text;
using a syntactic chatbot adaptor software module to process said raw chatbot input text, thus producing chatbot-ready input text; and
transmitting said chatbot-ready input text to said target chatbot.

8. The method of claim 7, wherein said chatbot output text messages further comprise a chatbot HTTP complex text message, said method comprising:
using said chatbot type to parse said chatbot HTTP complex text message and determine its HTTP links;
determine, using said HTTP links, and a link mapping table corresponding to said chatbot type, at least one sub-dialog in said link mapping table that corresponds to said HTTP links, and:
for each different HTTP link where a link matching table dialog is found, generating a detail-dialog with said user by:
using said detail-dialog to create said dialog manager input text, and using said dialog manager, and a selected said automated text-to-speech service to output said dialog manager input text to said user as a detail-dialog audio file;

receiving, from said user, a detail audio response to said detail-dialog audio file as detail audio speech content, and using said detail audio speech content to produce detail chatbot-ready text corresponding to said different HTTP link; and when all HTTP link matching table dialogs have been obtained, assembling said detail chatbot-ready text corresponding to said different HTTP links into an overall text response to said chatbot HTTP complex text message.

9. The method of claim 7, wherein said method further automatically corrects for any of error conditions, call transfers, or terminations, said method further comprising:
  a) when said chatbot output text message is delayed beyond a chatbot response time threshold, automatically substitute a chatbot delayed replacement message for said chatbot output text message;
  b) when said user audio speech content is delayed beyond a user speech delay time threshold, automatically output an unexpected user pause audio file to said user;
  c) when audio noise is detected in said user audio speech content, and said user audio speech content cannot be interpreted, automatically output a line noise warning audio file to said user;
  d) when said chatbot transfers operation to a human agent, automatically output a call transfer audio file to said user;
  e) when said chatbot terminates its connection, automatically output a call termination audio file to said user.

10. The method of claim 7, further translating any of said chatbot output text messages and said user audio speech content from a first language to a second language.

11. A computer program for instructing a computer to perform the method of claim 1.

12. A computerized system for automatically converting legacy silent chatbot output text messages from a plurality of different chatbot types and a plurality of different text message types to voice output for a user, said system comprising:
  a text-to-audio chatbot adaptor comprising at least one computer processor and computer memory, said text-to-audio chatbot adaptor configured to receive a chatbot output text message, determine a chatbot type and a chatbot output text message type, and store said chatbot output text message type in memory as session data;
  said text-to-audio chatbot adaptor further configured to use said chat output text message to obtain any of dialog manager input text and session data for each said chatbot type and said chatbot output text message type that is not a complex HTTP message type;
  said text-to-audio chatbot adapter further configured so that after said dialog manager input text has been created, to further use a dialog manager, said dialog manager input text, and chatbot configuration data corresponding to said chatbot type to:
    select an automated text-to-speech service;
    use a selected said automated text-to-speech service to produce an output audio file corresponding to said dialog manager input text; and automatically output said output audio file.

13. The system of claim 12, wherein said text-to-audio chatbot adaptor further comprises at least one adaptor code configured to determine which fields of a given message type comprise payload text;

Said text-to-audio chatbot adaptor further configured to retrieve said message type from said session data, and to use said chatbot type and message type to select said at least one adaptor code, thereby producing a selected adaptor code, and to use said selected adaptor code to extract payload text from said chatbot output text messages.

14. The system of claim 12, said system further comprising a dialog manager (audio speech to text converter) comprising said at least one computer processor and said memory, said dialog manager configured to convert user audio speech content into text for a target chatbot selected from a plurality of different chatbots, by using said chatbot configuration data for said target chatbot, and any said session data from a previous chatbot message with said user, to select a preferred speech-to-text service from a plurality of different speech-to-text services;
  said dialog manager further configured so when said previous chatbot message consisted of a set of options, to generate a set of instructions for said preferred speech-to-text service to determine with high certainty at least one meaning of a user utterance among a set of expected user utterances, thus determining a set of likely user utterances;
  said dialog manager further configured to use said preferred speech-to-text service and said set of likely user utterances to produce raw chatbot input text, and to further use a syntactic chatbot adaptor device comprising said at least one computer processor and said memory to process said raw chatbot input text, thus producing chatbot-ready input text; and to transmit said chatbot-ready input text to said target chatbot.

15. The system of claim 14, wherein said dialog manager is further configured so that when said chatbot output text messages further comprise a chatbot HTTP complex text message, dialog manager uses said chatbot type to parse said chatbot HTTP complex text message and determine its HTTP links; and
  said dialog manager is further configured to determine, using said HTTP links, and a link mapping table corresponding to said chatbot type, at least one sub-dialog in said link mapping table that corresponds to said HTTP links, and:
  said dialog manager is further configured so that for each different HTTP link where a link matching table dialog is found, generate a detail-dialog with said user by:
  using said detail-dialog to create said dialog manager input text, and to select said automated text-to-speech service to output said dialog manager input text to said user as a detail-dialog audio file;
  said dialog manager further configured to receive, from said user, a detail audio response to said detail-dialog audio file as detail audio speech content, and to use said detail audio speech content to produce detail chatbot-ready text corresponding to said different HTTP link; and
  when all HTTP link matching table dialogs have been obtained, to assemble said detail chatbot-ready text corresponding to said different HTTP links into an overall text response to said chatbot HTTP complex text message.

16. The system of claim 14, wherein said dialog manager is further configured to automatically correct for any of error conditions, call transfers, or terminations by any of:
  a) when said chatbot output text message is delayed beyond a chatbot response time threshold, to automatically substitute a chatbot delayed replacement message for said chatbot output text message;

b) when said user audio speech content is delayed beyond a user speech delay time threshold, to automatically output an unexpected user pause audio file to said user;

c) when audio noise is detected in said user audio speech content, and said user audio speech content cannot be interpreted, to automatically output a line noise warning audio file to said user;

d) when said chatbot transfers operation to a human agent, to automatically output a call transfer audio file to said user;

e) when said chatbot terminates its connection, to automatically output a call termination audio file to said user.

17. The system of claim 14, wherein said text-to-audio chatbot adaptor is configured to use said chat output text message to obtain any of dialog manager input text and session data by performing any of:

a) using said chatbot type and message type to extract payload text from said chatbot output text message, thereby creating dialog manager input text; or b) when said message type comprises a plurality of option fields, extract question text from each option field containing question text, thereby creating a plurality of extracted option question texts, and storing said option fields in memory as session data;

using said plurality of extracted option question texts to construct a full options message text, thereby creating dialog manager input text; or c) when said message type comprises yes-no option type messages, extract yes-no question text from each option field, thereby creating a plurality of extracted yes-no alternative texts, and storing these yes-no options in memory as session data; and using said plurality of extracted yes-no alternative texts to construct a full yes-no message, thereby creating dialog manager input text; or d) when said message type comprises an HTTP link, use said HTTP link as input into a HTTP link conversion table stored in memory, determine an HTTP-corresponding text, and use said HTTP-corresponding text to create dialog manager input text.

18. The system of claim 17, wherein said text-to-audio chatbot adaptor is further configured to comprise at least one chatbot-specific message parsing and lexical glue rules;

said text-to-audio chatbot adaptor is further configured to use said chatbot type to retrieve said chatbot-specific message parsing and lexical glue rules; and text-to-audio chatbot adaptor is further configured to use said chatbot-specific message parsing and lexical glue rules to construct said full options message text.

19. The system of claim 17, wherein said text-to-audio chatbot adaptor is further configured to comprise at least one chatbot-specific yes-no message parsing and yes-no alternative lexical glue rules;

said text-to-audio chatbot adaptor further configured to use said chatbot type to retrieve said chatbot-specific yes-no message parsing and yes-no alternative lexical glue rules, and to further use said chatbot-specific yes-no message parsing and yes-no alternative lexical glue rules to construct said full yes-no message.

20. The system of claim 17, wherein said HTTP link conversion table is plurality of chatbot-specific HTTP link conversion tables, each containing chatbot-specific default text;

said text-to-audio chatbot adaptor is further configured to use said chatbot type to select a selected HTTP link conversion table and select a chatbot-specific default text from memory;

said text-to-audio chatbot adaptor is further configured to use said selected HTTP link conversion table as said HTTP link conversion table, and to use a selected said chatbot-specific default text as a default text; and wherein if no HTTP-corresponding text is determined, to use said default text as said dialog manager input text.

\* \* \* \* \*